United States Patent
Venolia

[19]

[11] Patent Number: 6,061,062
[45] Date of Patent: May 9, 2000

[54] ZOOMING CONTROLLER

[75] Inventor: Daniel Scott Venolia, San Francisco, Calif.

[73] Assignee: Apple Computer, Inc., Cupertino, Calif.

[21] Appl. No.: 08/104,251

[22] Filed: Aug. 9, 1993

Related U.S. Application Data

[63] Continuation of application No. 07/811,830, Dec. 20, 1991, abandoned.

[51] Int. Cl.[7] .................................................. G06F 3/00
[52] U.S. Cl. ........................................................... 345/341
[58] Field of Search .................................. 340/706, 709, 340/710, 712, 731; 395/155, 161; 345/127, 131, 184, 339, 341

[56] References Cited

U.S. PATENT DOCUMENTS

| | | | |
|---|---|---|---|
| 4,755,811 | 7/1988 | Slavin et al. | 340/731 |
| 4,790,028 | 12/1988 | Romage | 340/731 X |
| 4,794,388 | 12/1988 | Matthews | 345/184 |
| 5,032,989 | 7/1991 | Tornetta | 340/731 X |
| 5,075,673 | 12/1991 | Yanker | 340/710 |
| 5,129,057 | 7/1992 | Strope et al. | 340/706 X |
| 5,136,690 | 8/1992 | Becker et al. | 395/161 |

*Primary Examiner*—Jeffery Brier
*Attorney, Agent, or Firm*—Blakely, Sokoloff, Taylor & Zafman

[57] ABSTRACT

A method and device for accessing a broad data field having a fine resolution. The user selects a scale which can be varied. The scale controls a range within the data field. By moving the range to encompass different portions of the data field, the user can scan that portion of the data field. The present invention allows the user to simultaneously select the scale while moving the range over different portions of the data field. Thus, the user can "zoom in" and "zoom out" of different portions of the data field.

In one embodiment of the present invention, a particular piece of data within the broad data field can be accessed. First, the scale is selectively varied, thereby controlling a range within the data field. Then, the range is moved to encompass portions of the data field in which the piece of data resides. Next, the scale is successively decreased while, simultaneously, points successively closer to the location are kept with the range. The scale is decreased (i.e., increasing the range's resolution) and the range is moved in this manner until the piece of data is actually accessed.

10 Claims, 10 Drawing Sheets

ZOOMING CONTROLLER

This is a continuation of application Ser. No. 07/811,830, filed Dec. 20, 1991, abandoned.

FIELD OF THE INVENTION

The present invention pertains to the field of computer systems. In particular, the present invention relates to a method and device enabling a computer system to access a data field having a broad range and a fine resolution.

BACKGROUND OF THE INVENTION

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

Many types of data have a broad range and a fine resolution. For example, a videodisk is composed of a continuum of frames. The video disk can store up to a series of tens of thousands of frames. Thus, it has approximately five orders of magnitude. Likewise, electronic music composition requires controlling frequencies over the entire audible scale ranging from 15 to 20,000 hertz. Thus, three orders of magnitude are required to cover this range. Similarly, a five second digital audio clip may require five orders of magnitude to access each bit sample. These types of data are often linear in the sense that there are starting and ending points and many linked "frames" of data between the starting and ending points.

In order to access a videodisk, one needs frame accurate control over the entire medium. In other words, a user must be able to readily pick out one particular desired frame nestled among tens of thousands of frames. It becomes readily apparent that tasks such as adjusting key frames in an video film or manipulating audio samples, can be quite time consuming and frustrating. What is needed is a method or apparatus which lets the user find and access one particular desired piece of data which is located among a broad range of data.

In the past, this was accomplished by using scroll bars. However, scroll bars typically can handle only two orders of magnitude. Consequently, a scroll bar would need to be approximately twenty yards long in order to grant access to each frame of a video disk. This is impracticable.

Another method used in the prior art was to implement VCR-type controls. This allows the user control over the entire range of data. However, these types of controls lack selectivity. For example, it would be difficult for a user to stop precisely on one particular desired frame of a VCR tape. The user would probably either overshoot or undershoot the desired frame and would probably go back and forth searching for that particular frame. What is needed is a method that gives the user control over a broad range, while giving the user random access to any particular piece of data within that range, especially at fine resolutions.

Yet another method used in the prior art to solve this problem is to provide one control for magnification of the data and another control for scanning at the selected magnification. One product utilizing this technique is SoundEdit™ by Farallon Computing, Inc. However, this implementation has a drawback in that it requires two separate controls. A further disadvantage is that these two controls cannot be operated simultaneously. A user has to change the magnification control independently from the navigation control. Such a system results in wasted time and effort. Thus, what is needed is a method for providing the user with easy and fluid interaction over varying magnification scales while simultaneously providing the user with the capability of scanning at that magnification scale.

SUMMARY AND OBJECTS OF THE INVENTION

In view of the problems associated with providing a user with control over a broad range of data, particularly linear data, one objective of the present invention is to provide the user with access of data down to very fine resolutions in a simple, natural, and cost effective method by utilizing a cursor positioning device such as a mouse, a trackball, touch tablet, joystick or other input device having the capability of providing control for movement in 2 dimensions (2 degrees of freedom) of a cursor.

Another objective is to increase the speed, accuracy, and selectivity of accessing data over a broad range by providing the user with easy and fluid interaction over varying magnification scales, while simultaneously providing the user with the capability of scanning the data at that magnification scale.

A method and device for accessing a broad data field having a fine resolution is described. The user selects a scale which can be varied by the user. The scale controls the magnification at which the user accesses and/or examines the data, and it may be considered that a selected magnification provides a particular range of the data (from one point to another point in the data). By moving the range to encompass different portions of the data field, the user can scan that portion of the data field. The present invention allows the user to simultaneously select the scale while moving the range over different portions of the data field. Thus, the user can "zoom in" and "zoom out" of different portions of the data field.

In one embodiment of the present invention, a particular piece of data within the broad data field can be accessed. First, the scale is selectively varied, thereby controlling a range within the data field. Then, the range is moved to encompass portions of the data field in which the piece of data resides. Next, the scale is successively decreased while, simultaneously, points successively closer to the location are kept with the range. The scale is decreased which increases the magnification (i.e., increasing the range's resolution). The range is moved in this manner until the piece of data is actually accessed.

This is accomplished by using an input device having two degrees of freedom (e.g., a mouse, trackball, touch tablet, joystick, etc.). These two degrees of freedom can be provided by movement along two different axes. For example, movement can be along the x and y-axes in a Cartesian coordinate system. Movement along one axis controls the selection of the scale, while movement along the other axis controls the particular range at that scale. In preferred embodiment, these axes can be remapped to control the position of a cursor on a display screen, instead of the scale and range. In other words, the same input device can control either the position of a cursor or control the scale and range, simply by remapping the axes of the input device.

Other objects, features, and advantages of the present invention will be apparent from the accompanying drawings and from the detailed description that follows below.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for providing the user with easy and fluid interaction over varying magnification scales, while simultaneously providing the user with the capability of scanning at that scale is described. In the following description, the present invention is implemented in reference to a Zooming History Controller and a Zooming Videodisk Controller.

It will be obvious, however, to one skilled in the art that the present invention can equally be applied to other implementations, as well. The present invention can be used in conjunction with editing textual documents. This invention enhances the user's ability to view a textual document at any point in its creation history by enabling the user to control the historical view of a document that may have been around for years and modified on a time scale of seconds. Thus, the present invention enhances the control of a document by showing the state of the document as it appeared at a selected time. Thus, the various edits to a document over time may be viewed; in other words, the document may be viewed at various stages of its creation such as a first draft, a second draft, etc.

Figure 1:
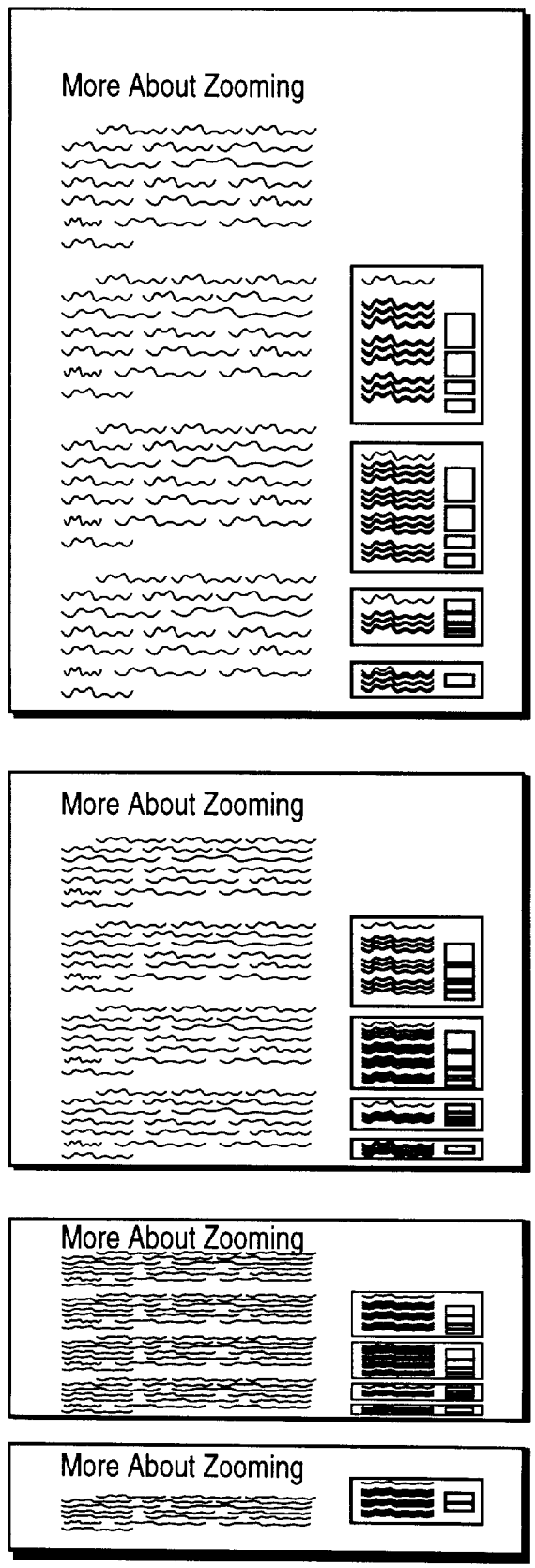
FIG. 1 shows an example of the reduction of a full sized textual document for one embodiment of the present invention.

On the other hand, the present invention can be used to graphically reduce a document. By using the structure implicit in the document, a more semantically valid zoom can be achieved. Outlines can progressively collapse the most-indented items, showing just structure and spacing. FIG. 1 shows the reduction of one page of a full sized textual document. The sequence of steps for a textual document as it is zoomed out are: squeezing out white space, squashing all but the first lines of each paragraph, eliminating all but the first lines, eliminating all body text while leaving headings and sub-headings, then eliminating subheads, leaving headings only. Similarly, computer programs may also be edited in this manner.

Figure 2:
FIG. 2 shows an example of one embodiment of the present invention for accessing a name from a phone book.

The present invention also enhances accessing any collection of items that has an order, such as a data set having a linked collection of items. For example, one embodiment is to access a phone directory as shown in FIG. 2. Initially, twenty names at regular intervals from A to Z are displayed. An indicator portrayed as a triangle with an attached horizontal line, can slide up and down this list. The user can implement another control to zoom in and out of this list. For example, as the user zoomed in on Collins, the display would show names sampled over A to N, then from B to D, then only the C's, and so on. The desired name is selected by moving the indicator while zooming in on the desired name. Similarly, in another embodiment, the present invention can be used as a dictionary. The user starts with the most frequently used words and then "zooms in" on successively less frequently used words.

Another embodiment of this invention is to adjust a purely abstract number for a frequency of a music synthesizer, simulation variable, etc. Horizontal mouse movement would choose the digit that is incremented or decremented by vertical mouse motion. Along these same lines, the present invention can also be applied to adjusting key frames in a video film or manipulating audio samples.

Figure 3:
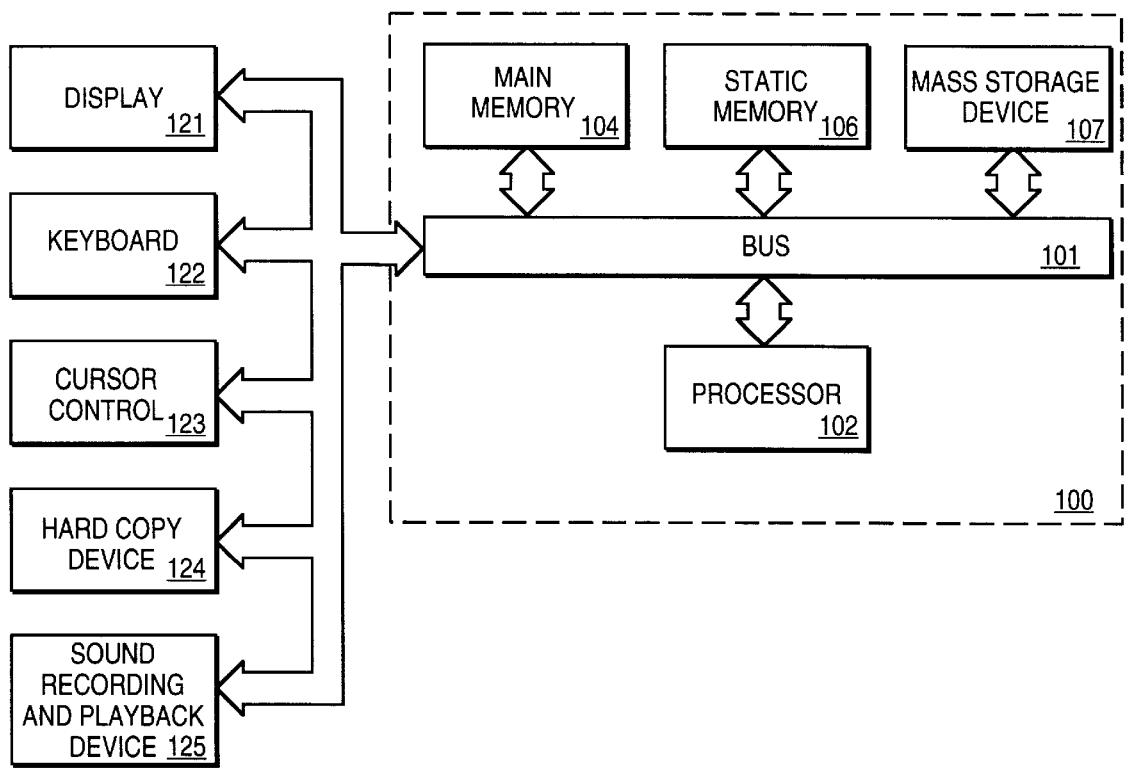
FIG. 3 is a block diagram of the computer system upon which the present invention may be implemented.

Referring to FIG. 3, the computer system upon which the preferred embodiment of the present invention is implemented is shown as 100. 100 comprises a bus or other communication means 101 for communicating information, and a processing means 102 coupled with bus 101 for processing information. System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102, and a data storage device 107 such as a magnetic disk or optical disk and its corresponding disk drive. Data storage device 107 is coupled to bus 101 for storing information and instructions. Computer system 100 may further be coupled to a display device 121, such as a cathode ray tube (CRT) coupled to bus 101 for displaying information to a computer user. An alphanumeric input device 122, including alphanumeric and other keys, may also be coupled to bus 101 for communicating information and command selections to processor 102. An additional user input device is cursor control 123, such as a mouse, a trackball, or cursor direction keys, coupled to bus 101 for communicating direction information and command selections to processor 102, and for controlling cursor movement on display 121. This input device typically has two degrees of freedom in two axes, a first axis (e.g. x) and a second axis (e.g. y), which allows the device to specify any position in a plane. Another device which may be coupled to bus 101 is hard copy device 124 which may be used for printing instructions, data, or other information on a medium such as paper, film, or similar types of media. Lastly, computer system 100 may be coupled to a device for sound recording and/or playback 125 such an audio digitizer means coupled to a microphone for recording information. Further, the device may include a speaker which is coupled to a digital to analog (D/A) converter for playing back the digitized sounds.

In the currently preferred embodiment, computer system 100 is one of the Macintosh® family of personal computers such as the Macintosh® II manufactured by Apple® Computer, Inc. of Cupertino, Calif. (Apple and Macintosh are registered trademarks of Apple Computer, Inc.). Processor 102 is one of the 68000 families of microprocessors, such as the 68000, 68020, or 68030 manufactured by Motorola, Inc. of Schaumburg, Ill.

Mouse Control for the Present Invention

Figure 4:
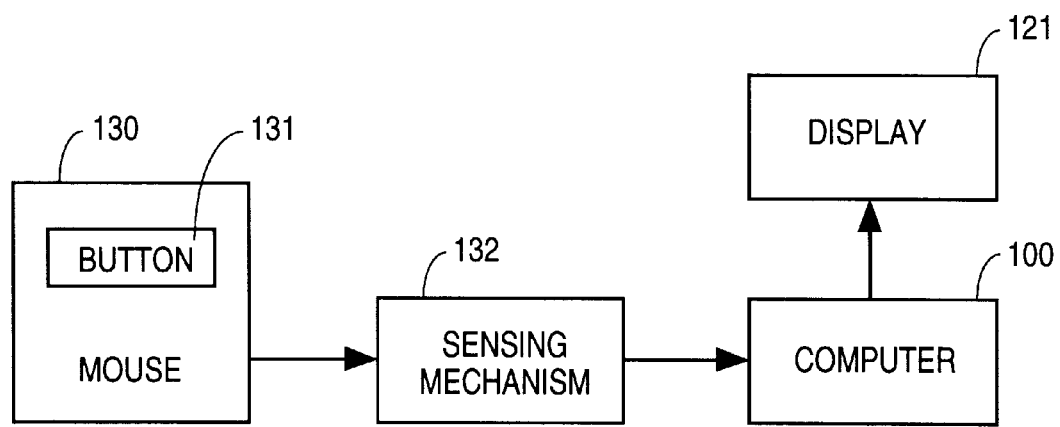
FIG. 4 is a block diagram of one embodiment wherein a mouse is utilized.

In one preferred embodiment of the present invention, a mouse is used. FIG. 4 is a block diagram showing this embodiment. A mouse 130 is a small hand-held box-like device which is coupled to the computer system 100 by a cable. A sensing mechanism 132 monitors the magnitude and direction of movement of mouse 130 and generates an output signal based thereon. This signal is sent to computer 100 for processing. After processing, computer 100 sends a signal to display device 121, which can effect a change in the display corresponding to the mouse's movements. One or more push-down button(s) 131 are provided on the mouse 130. By depressing button(s) 131, a signal is sent to computer 100 that a desired location on display device 121 has been selected. The combination of moving mouse 130 to point a cursor to an object on the display screen and pressing the button(s) 131, while the cursor is pointing to the object to select the object, is called "point and click." An example of such a mouse can be found in U.S. Pat. No. Re. 32,632.

In the currently preferred embodiment, the mouse not only controls a cursor position on a display screen, but it can also be made to control two different parameters. The way in which this is accomplished is by "remapping" the mouse's axes from controlling the x and y-axes cursor movements to, instead, controlling two parameters. When an axis of the mouse is remapped to a parameter, motion in that axis no longer moves the cursor. Instead, it controls the parameter.

By disassociating the axis of the mouse from the cursor, the mouse movement is not constrained by the edges of the display screen. Typically, when the cursor is positioned at the edge of a display screen, further movement of the mouse in the direction towards that edge will not effect any changes in the cursor position. With the present invention, when the axes of the mouse is remapped to controlling two parameters instead of the cursor position, the mouse may be moved in a range corresponding to the range of the two parameters rather than a range constrained by the boundaries of a display screen. In short, the present invention allows an input device with two degrees of freedom such as a mouse, trackball, touch pad, joystick, etc. to remap its axes to controlling two or more different sets of parameters.

However, it can be disconcerting to users to see the cursor remaining stationary while the mouse is moving. To overcome this, the cursor is hidden whenever either axis of the mouse is being remapped. The cursor reappears when the mouse control is shifted back to controlling the cursor position.

With the cursor hidden, one problem is that visual feedback for motion in the remapped axis is reduced. This makes that axis parameter somewhat harder to control. In an alternative embodiment, this problem is minimized by ignoring the mouse's motion in the remapped axis, unless it is the dominant axis. The dominant axis is defined as being the axis that has been moved the most. Thus, only the parameter associated with the dominant axis is affected by the mouse's movements.

In one alternative embodiment, while an axis of the mouse is remapped, motion in that axis is not remapped, so the cursor retains its original position, until the mouse control is shifted back again to controlling the cursor. When both axes of the mouse are remapped to control two different parameters, the elements corresponding to those parameters will be highlighted as the parameters values change. When the mouse control is returned to controlling the cursor position, the cursor reappears over the last element affected.

The use of the mouse as a parameter control can also be supplemented by consistent visual reinforcement. For example, various icons can be used as indicators, pointers, and scrollers and various symbols may be used to represent certain aspects of the parameters being controlled.

Some parameters need an approximate setting. Others demand a more precise value. When controlling a remapped approximate parameter, each unit of motion of the mouse (~ one hundredth of an inch for the Macintosh™ mouse) can effect, a change in the value of the parameter. For values that need to be controlled more precisely, one preferred embodiment is to reduce the mouse's motion units by eight times. Otherwise, the mouse's movements become too sensitive.

When values are assigned to parameters, the preferred embodiment is to make the mouse axes consistent with a positive or a negative change in that parameter's value. In other words, if a slider, scroll bar, or other graphic widget is used to represent the value that the mouse is controlling, the mouse axes are remapped to the dominant graphic axes. For example, if the slider is graphically oriented vertically, upward motion of the mouse moves the slider knob up. If a parameter value has no graphic representation in the system, a standard is applied consistently. One embodiment of this concept is to define rightward and upward movement to be "more" and leftward and downward to be "less".

In the preferred embodiment of the present invention, one parameter corresponds to a scale and the other parameter corresponds to an increment within the scale's range. The mouse is used to allow a user to simultaneously adjust both the control of the time scale and the control for scanning at the selected time scale. This is accomplished by reassigning the axes of the mouse from moving the cursor to controlling the time scale and the selected value at that time scale. By depressing the mouse button while the cursor is positioned over certain interface elements, the mouse is disengaged from the cursor. Instead, vertical movement of the mouse adjusts the time scale and horizontal mouse movement adjusts the selected value at that time scale. These parameters and their control will be explained in greater detail below.

The Preferred Embodiment—Zooming History Controller

The present invention as applied to the Zooming History Controller enables the user to browse the time domain at any time scale (magnification) or choose an incremental time value by successive refinement. The Zooming History Controller zooms on a time continuum for picking a date/time. This is accomplished by utilizing a mouse in the manner described above.

Figure 5:
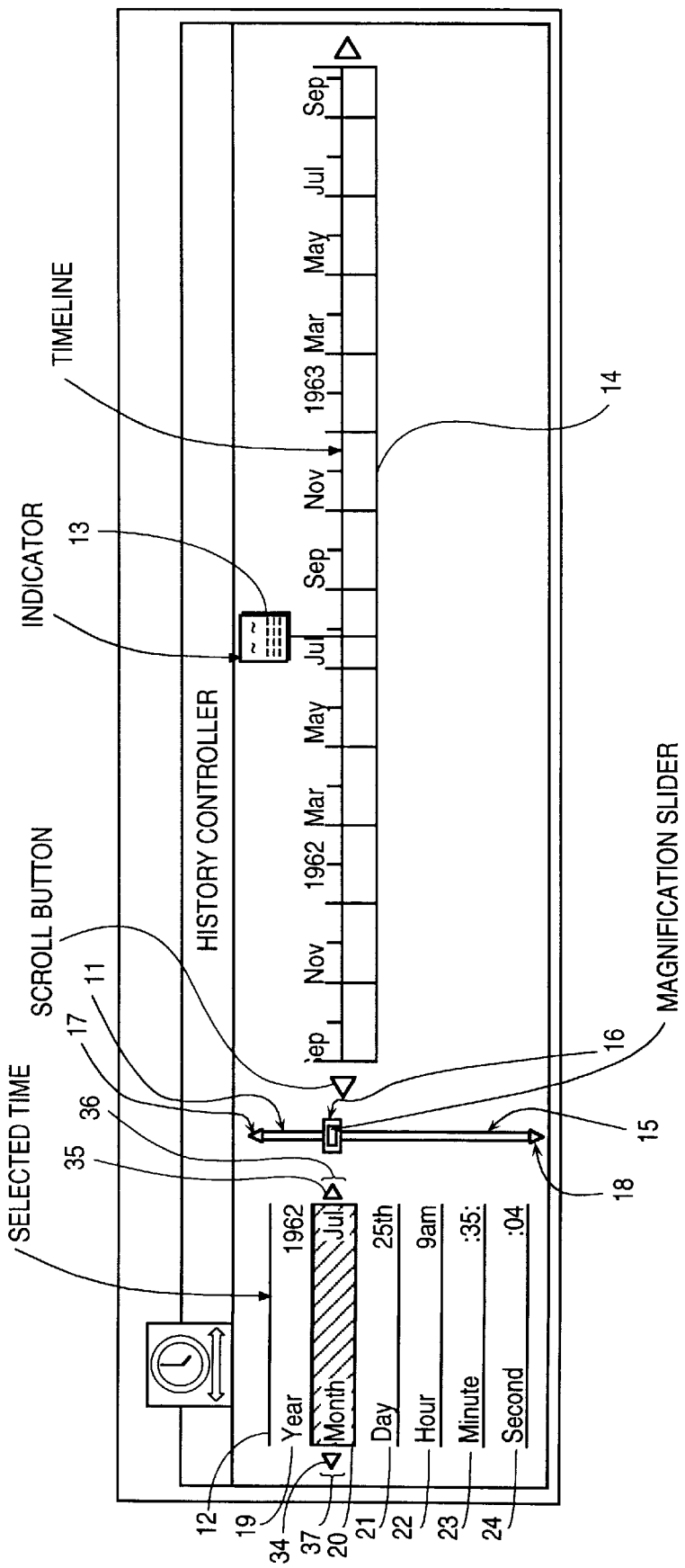
FIG. 5 is a screen shot of the Zooming History Controller display.

FIG. 5 shows the Zooming History Controller "© Apple Computer, Incorporated". Basically, the user controls two values: the time scale and the selected time within that time scale. The time scale is controlled and shown by scale slider 11. Scale slider 11 also gives the current scale of timeline 14. The selected time is shown both in the column of fields 12 and by the indicator 13 on timeline 14.

Scale slider 11 is comprised of a vertical bar 15, a control knob 16, and arrow icons 17 and 18. By using the mouse or other cursor positioning means to position the cursor on vertical bar 15 and clicking the mouse button, control knob 16 highlights and repositions itself to the cursor location. If the cursor is positioned over control knob 16 and the mouse button is depressed and kept depressed, control knob 16 will track the vertical movements of the mouse by sliding up and down vertical bar 15 as the mouse is dragged up and down. Control knob 16 will continue to track the vertical mouse movements until the mouse button is released. All the while that control knob 16 is being moved, the scale of timeline 14 is also correspondingly increased or decreased according to the vertical position of control knob 16.

Scale slider 11 can also be controlled by disassociating the mouse from the cursor and moving the mouse in a vertical motion. If the cursor is positioned over timeline 14 and the mouse button is depressed and kept depressed, control knob 16 will be highlighted and will move correspondingly to the vertical movement of the mouse. As control knob 16 slides up vertical bar 15, the scale of timeline 14 increases (i.e., the amount of time covered by the timeline increases), thereby decreasing the resolution of timeline 14. In other words, the magnification at which one observes the data (timeline) decreases. Conversely, as control knob 16 slides down vertical bar 15, the scale of timeline decreases (i.e., the amount of time covered by the timeline decreases), thereby increasing the resolution of timeline 14. As the scale of timeline 14 changes, so too is the appearance of the timeline altered to reflect the new scale.

Also, as control knob 16 moves up vertical bar 15, arrow icon 17 is highlighted. Arrow icon 17 resides at the top of vertical bar 11 and points straight up. As control knob moves down vertical bar 15, arrow icon 18 is highlighted. Arrow icon 18 resides at the bottom of vertical bar 15 and points straight down. The mouse's movements correspond to changes on the display screen in units of pixels. However, each pixel unit changes the scale value so slightly that control knob 16 might not move at all or might not appear to move. By highlighting arrow icons 17 and 18, the association between the mouse movement and the changes in scale is enhanced.

When the user releases the mouse button, the highlights and arrow markers disappear, and the cursor reappears. Even if the mouse had been moved vertically, the cursor reappears at the vertical position that it had when the mouse button was first depressed. While the mouse button was depressed, its vertical axis was decoupled from the cursor, and attached instead to controlling the scale.

Figure 6A:
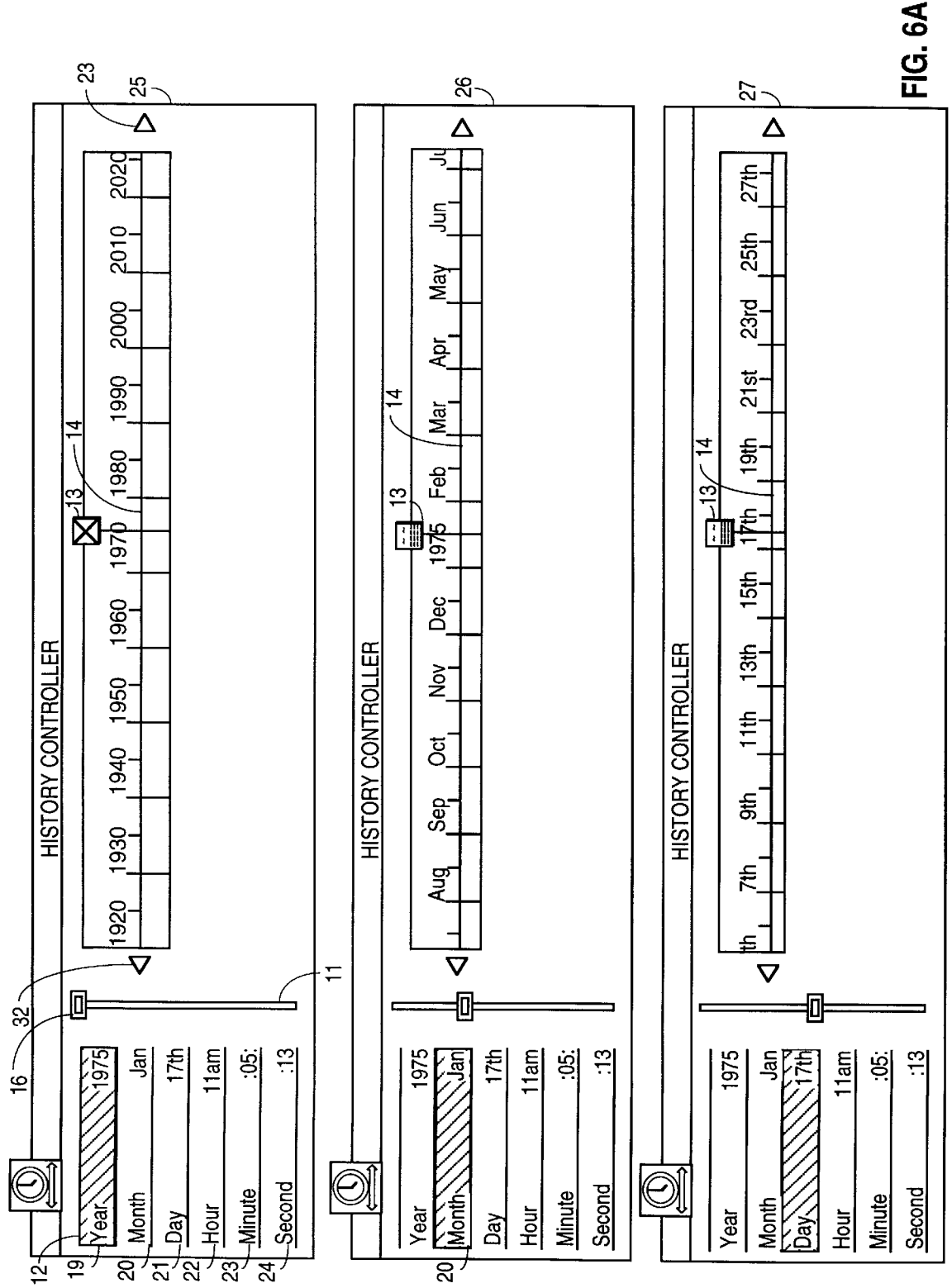
FIG. 6 are a series of screen shots of the Zooming History Controller display at various time scales ranging from decades to seconds.
Figure 6B:
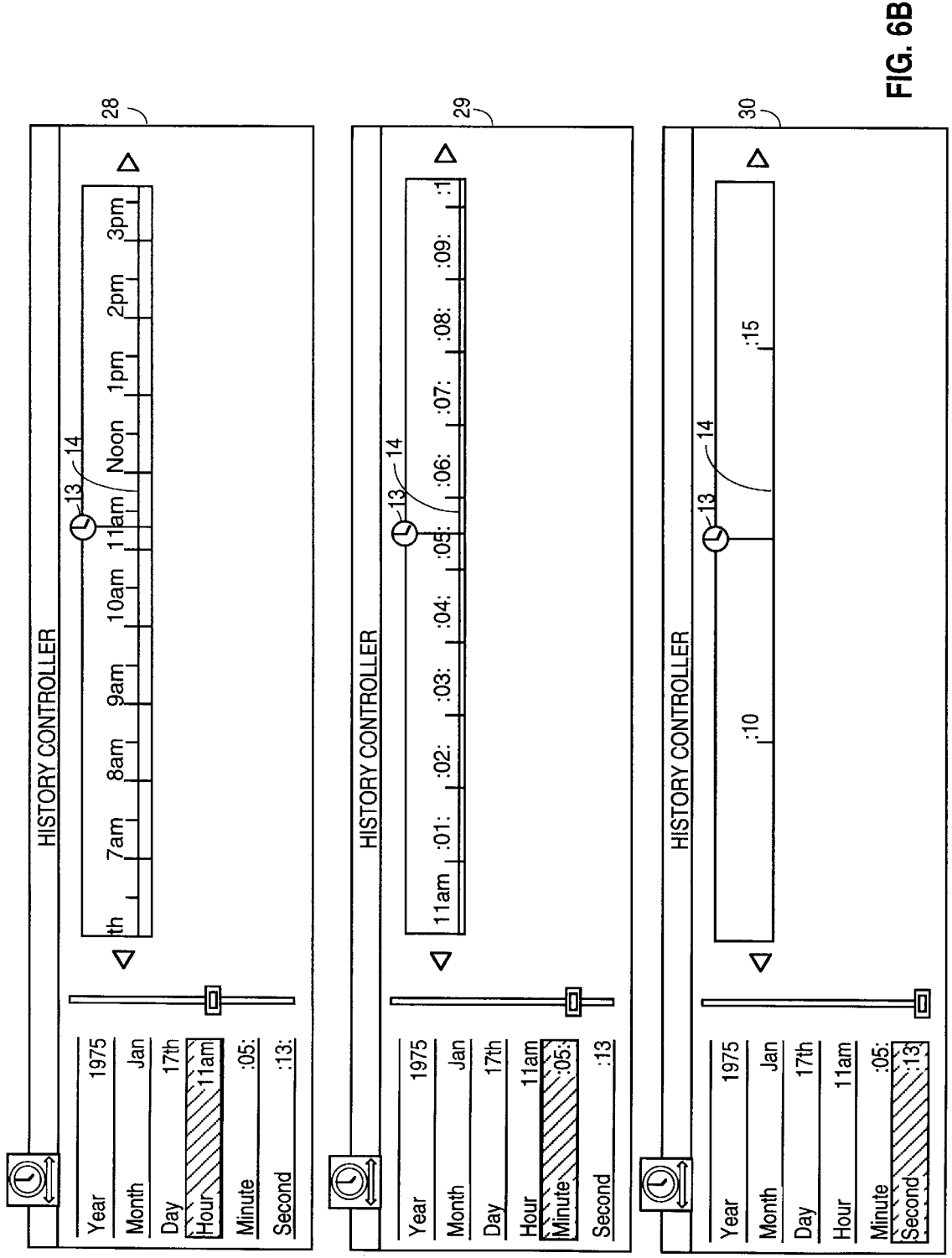

FIG. 6 shows screen shots 25–30 of timeline 14 at various scales ranging from decades to seconds. The selected time is shown by the column of fields 12. The column of fields 12 is divided into rows 19–24, corresponding to convenient time fields, shown on the left-hand side, and the selected time units, shown on the right-hand side. Row 19 gives the year field (Year) and the selected year unit (1975). Row 20 gives the month field (Month) and the selected month unit (Jan). Row 21 gives the day field (Day) and the selected day unit (17th). Row 22 gives the hour field (Hour) and the selected hour unit (11 am). Row 23 gives the minute field (Minute) and the selected minute unit (:05). Row 24 gives the seconds field (Second) and the selected second unit (:13). Thus, the selected time in FIG. 3 is 13 seconds past 11:05 am of Jan. 17, 1975.

It can be seen from screen shots 25–30 that timeline 14 looks different for different time scales, even though they represent the same selected time (i.e., 11:05:03 am Jan. 17, 1975). Screen shot 25 depicts timeline 14 wherein the scale is in years. The selected field is depicted by shading the correct row 19–24 which corresponds to that particular scale. In screen shot 25, since the year field was selected, row 19 which corresponds to the year field, is shaded. The selected year, "1975", is shown on the right-hand side of row 19. Similarly, screen shot 26 depicts timeline 14 wherein the scale is in months. Accordingly, row 20 which corresponds to the month field, is shaded. Likewise, screen shots 27–30 depict timeline 14 wherein the scale is in days, hours, minutes, and seconds, respectively.

It can be seen from screen shots 25–30 of FIG. 6 that as the scale is decreased, the resolution of timeline 14 is increased. Screen shot 25 shows the scale in years. Timeline 14 gives a range of approximately a decade. This allows the user to select a time to a resolution of years. Screen shot 26 shows the scale in months. Its timeline gives a range of approximately two years. This allows the user to select a time to a resolution of months instead of years. As the scale is decreased, the resolution increases. Screen shot 30 shows the scale in seconds. The range of timeline 14 for screen shot 30 covers a range of approximately 15 seconds. This allows the user to select a time to a resolution of seconds. Thus, by simulating controlling the scale and value of the timeline, this embodiment allows the user to select a particular time, within seconds, from a range of a century.

The fields and the selected times are highlighted up to the current finest-resolved selected time. Finer scales and units are dim, in comparison. This is illustrated in FIG. 6. In screen shot 25, the selected scale is in years and the corresponding selected time unit is 1975. Thus, for that resolution, the "Year" field and the "1975" time unit are highlighted. As the resolution increases, as in screen shot 28, it can be seen that the prior selected fields (i.e., "Year", "Month", and "Day") and selected time units ("1975", "Jan", and "17th") remain highlighted. The current selected field ("Hour") and the current selected time unit ("11 am") are also highlighted. Yet the finer fields ("Minute" and "Second") and time units (":05 :" and ":13") which have yet to be selected by the user, remain dimmed.

As shown in FIG. 6, indicator 13 includes an icon and a vertical line segment. The icon for indicator 13 resides halfway along the top of timeline 14. The vertical line segment extends from the bottom of the indicator icon, through timeline 14, to the bottom edge of timeline 14. The line segment intersects timeline 14 which corresponds to the selected time (also displayed by the column of fields 12). As the scale is changed, the icon representing the indicator also changes to reflect the change in the scale. For example, the indicator icon representing the year scale, is in the shape of an hourglass, as shown in screen shot 25. The icon representing indicator 13 changes to the shape of a calender for time scales of months and days, as shown in screen shots 26 and 27, respectively. The icon representing indicator 13 changes to the shape of a clock for time scales of hours and minutes, as shown in screen shots 28 and 29, respectively. The icon representing indicator 13 changes to the shape of a stopwatch for the time scale of seconds.

Once the desired field has been selected, the user may then select any time unit within that field. For example, in screen shot 26 of FIG. 6, since the user has selected the month scale, the user may now select time units corresponding to months of the year (e.g., January–December). This is accomplished by moving the mouse horizontally. (Remember that the scale was controlled by moving the mouse vertically.) Horizontal movement of the mouse controls the timeline and thus the position of access into the data at the selected scale/magnification.

Furthermore, once a desired field has been selected, the scale can, nevertheless, be changed within that field. For example, in screen shot 25 of FIG. 6, even though the selected field is "Years", the user may change the scale of timeline 14 so long as what is displayed remains in years. Thus, timeline 14 may have an enlarged scale such that a decade is shown or may have a reduced scale such that only half a dozen years are shown. Likewise, in screen shot 27, given the same field ("Day", timeline 14 may have a scale encompassing 12 days (as shown) or may have a reduced scale encompassing only a couple of days.

Figure 7:
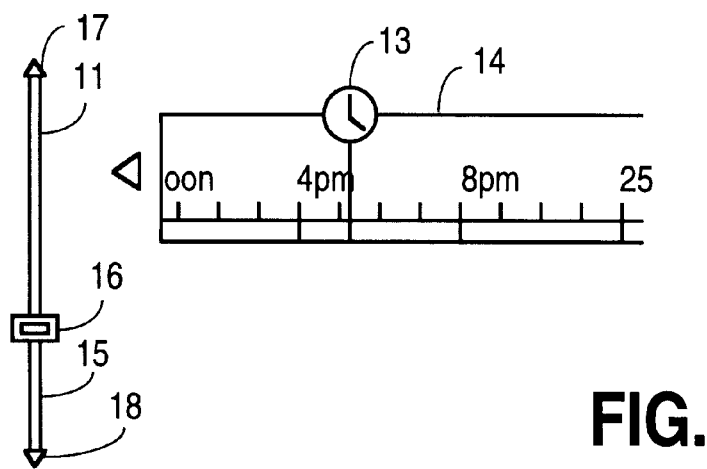
FIG. 7 depicts the auto-scrolling of the Zooming History Controller's timeline (allowing movement at a particular magnification through the data) and scale slider (allowing modification of the magnification at which the data can be scanned).

FIG. 7 shows the manipulation of the timeline. The timeline is manipulated by using the mouse to position the cursor over some point of timeline 14. When the mouse button is then "clicked", indicator 13 is repositioned to where the cursor is located. Indicator 13 and control knob 16 are highlighted. Arrows 17 and 18 appear above and below vertical bar 15 of scale slider 11. In addition, the cursor is removed from the display screen so that it is no longer displayed.

As the mouse is moved horizontally to the left and right, while still keeping the mouse button depressed, indicator 13 tracks the mouse's movements. In other words, indicator 13 (i.e., the icon and the vertical line segment) moves horizontally, left and right, across the width of timeline 14 to track the mouse's movements.

Figure 8:
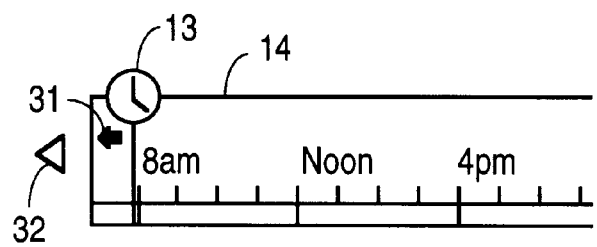
FIG. 8 depicts auto-scrolling the Zooming History Controller's timeline.

When the indicator is moved horizontally, it is constrained to stay within the boundaries of the timeline. If the indicator is moved to either the right or left ends of the timeline, an arrow symbol appears. FIG. 8 shows the situation wherein indicator 13 is moved towards the left end of timeline 14. When indicator 13 reaches the left-most edge of timeline 14, arrow symbol 31 appears to the left of indicator 13 and points leftward. Similarly, if the indicator is moved to the right-most edge of the timeline, an arrow symbol pointing to the right will appear to the right of the indicator.

When the indicator is moved to either edge of the timeline, in addition to the display of the arrow symbol, the timeline will scroll. The timeline will scroll to the right if the indicator is moved to the left-most edge. Conversely, the timeline will scroll to the left if the indicator is moved to the right-most edge. Thus, in FIG. 6, the "8 am", "Noon", "4 pm", etc. markers and their corresponding submarkers will be scrolled to the right. New markers such as "4 am", "Midnight", "8 pm", etc. and their corresponding submarkers will successively appear from the left and be progressively scrolled to the right.

Figure 9:
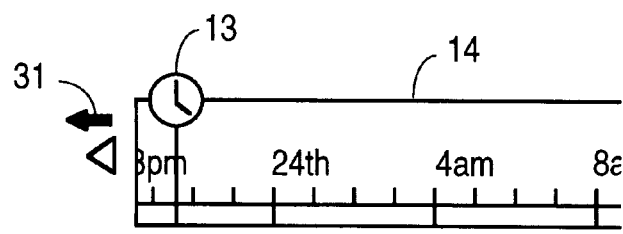
FIG. 9 depicts the Zooming History Controller's timeline when the user scrolls the timeline rapidly.

Furthermore, if the mouse is moved to the right or left, beyond the extremes of the timeline, the rate of the scrolling will increase. In addition, the arrow symbol will become longer. The farther that the mouse is moved beyond the timeline extremes, the faster the scrolling rate and the longer the arrow symbol become. FIG. 7 shows the situation wherein the mouse is moved to the left, beyond the left-most edge of timeline 14. It can be seen that indicator 13 is constrained within timeline 14. As the mouse is moved beyond that point, arrow symbol 31 becomes longer and timeline 14 is scrolled faster as shown in FIG. 9.

The timeline may also be scrolled without moving the indicator. This is accomplished by using two arrow icons which are positioned on either side of the timeline. Referring back to FIG. 6, it can be seen that arrow icons 32 and 33 are respectively located to the immediate left and right of timeline 14. Arrow icon 32 points to the left, and arrow icon 33 points to the right. If the user positions the cursor over one of these two arrow icons, depresses the mouse button, and keeps tit depressed, several events happen simultaneously. The cursor disappears, the selected arrow icon is highlighted, arrow icons appear above and below scale slider 11, control knob 16 becomes highlighted, timeline 14 begins to scroll, and arrow symbols appear.

Now, vertical motion of the mouse controls the scale. Horizontal motion of the mouse controls the direction and speed of timeline 14. Moving the mouse horizontally and vertically at the same time (i.e. a diagonal movement) will simultaneously adjust the scale and the position of access to the data at the selected scale. The direction of the scroll depends on which of the two arrow icons 32 or 33 that had been selected. If arrow icon 32 was selected, then timeline 14 scrolls to the right. Conversely, if arrow icon 33 was selected, then timeline 14 scrolls to the left.

FIG. 8 depicts the situation wherein the user has selected the left-pointing arrow icon 32. The more that the user moves the mouse to the left, the faster timeline 14 scrolls and left-pointing arrow symbol 31 lengthens correspondingly (as depicted in FIG. 9). If the user moves the mouse to the right, the rate at which timeline 14 scrolls is reduced and the length of arrow symbol 31 shortens. Similarly, if the user had selected the right-pointing arrow icon, that icon would be highlighted. Now, the further that the mouse is moved to the right, the faster timeline 14 scrolls to the left and the right-pointing arrow symbol lengthens correspondingly. If the mouse is moves to the left, the rate at which timeline 14 scrolls is reduced and the length of the right-pointing arrow symbol shortens.

The timeline may also be scrolled by positioning the cursor on one of the fields, depressing the mouse button, and keeping it depressed. The field then becomes highlighted and the timeline's scale changes correspondingly. The cursor disappears and arrow icons appear above and below scale slider 11 and to the right and left of the selected field. As before, vertical movement changes the timeline scale. However, now the scales are limited to that particular field selected.

For example, in FIG. 5, if the user selects the "Month" field 20 within the column of fields 12, timeline 14 is limited to displaying units of time in months. The user may move the mouse vertically in order to change the scale within this field in order to display more or less months. However, the user is limited to displaying time units of months. This means that the other fields such as "Year", "Day", "Hour", "Minute", and "Second" cannot be accessed just by moving the mouse vertically.

Horizontal movement of the mouse, in this mode, scrolls timeline 14. Note that indicator 13 remains stationary. Moving the mouse to the right causes timeline 14 to scroll to the left and increments the selected time unit corresponding to that field. Moving the mouse to the left causes timeline 14 to scroll to the right and decrements the selected time unit corresponding to that field. The time units corresponding to fields that have higher resolutions than the selected field remain unchanged. Only those time units which correspond to the selected field or a lower resolution field, change according to the scrolling of the timeline.

Thus, in FIG. 5, this mode allows the user to scroll timeline 14 by horizontal mouse movements. The currently selected field 20 is that of "Month", which is highlighted. The currently selected time unit is "Jul" as shown in field 20 and by indicator 13. If timeline 14 is scrolled to the right by moving the mouse to the left, the time unit would successively change to "June", "May", "April", etc. Eventually, if timeline 14 were scrolled far enough to the right, the time unit for the "Year" field 19 would change from its current "1962" to "1961". However, fields with higher resolutions (e.g., "Day" 21, "Hour" 22, "Minute" 23, and "Second" 24) than the currently selected field, along with their time units (e.g., "25th", "9 am", ":35 :", and ":04"), remain unchanged.

FIG. 5 also shows arrow icons 34 and 35 straddling the selected "Month" field 20. These arrow icons appear when the user selects this mode (i.e., when the user "clicks" the cursor on a particular field). Arrow icon 34 is positioned to the immediate left of the selected field and points to the left. Arrow icon 35 is positioned to the immediate right of the selected field and points to the right. Arrow icon 34 is highlighted if timeline 14 is scrolled to the right. Arrow icon 35 is highlighted if timeline 14 is scrolled to the left.

A small bracket appears across the tip of any of the above discussed arrow icons (i.e., scale slider, timeline, or field arrow icons) if the parameter described by that arrow icon reaches an outer limit. The bracket indicates that the parameter as represented by that icon has reached a limit and is being "blocked". The parameter remains blocked by the bracket until the parameter is pulled back from the limit.

For example, in FIG. 5, if timeline 14 were constrained to not extend after the date of July 1962, a bracket 36 would appear across the tip of field arrow icon 35, if the user attempted to scroll after the date of July 1962. If timeline 14 were constrained to not extend prior to the date of July 1962, a bracket 37 would appear across the tip of field arrow icon 34, if the user attempted to scroll prior to July 1962. Another example would be if the user attempted to increase the scale to a field greater than a "Year", a bracket would appear across the tip of scale arrow icon 17.

It would be apparent to those skilled in the art that the Zooming History Controller can be linked to and access a database. Some sample databases include musical compositions, films, textual documents, etc. For example, by linking the Zooming History Controller to a musical composition, the user may easily access one particular note among thousands within the composition. This is accomplished by assigning each note to one particular incremental time unit. The user may "zoom out" to locate the general area wherein the desired note resides. The user then "zooms in" on the desired note by successively decreasing the scale (increasing the magnitude) while keeping the note within the range until the desired note is located. Thus, the user may select a desired note by "zooming in" on it in the same manner as one would "zoom in" on a particular date/time. In other words, pieces of data within a database may be sequentially linked to incremental time intervals of the Zooming History Controller. As example of this concept is described in a following section entitled "Zooming Videodisk Controller", wherein the frames of a videodisk (or film) may be easily accessed.

Software Implementation

In one preferred embodiment of the present invention, the Zooming History Controller is divided into two functional blocks of software code. One block draws the contents of the Zooming History Controller based on a number of parameters. The other block changes the parameters based on the user's input. These blocks are referred to as the Draw and the Track routines, respectively.

The primary parameters to the Draw routine specify the currently selected time, the magnification, and the position of the indicator. Secondary parameters control the appearance and highlight of the various symbols and icons. This routine draws the Zooming History Controller off-screen and then copies it onto the display screen in order to minimize flashing and visual inconsistency. The primary parameters sometimes require drawing parts of the timeline that are not accessible to the user. For example, the times before and after the timeline's outer limits.

When the user "clicks" on one of the elements in the Zooming History Controller, the corresponding Track routine is invoked. Each Track routine starts by altering the mouse behavior (from controlling the cursor position to controlling the parameters) and changing the secondary parameters to make symbols and icons appear and highlight. While the mouse button is depressed, the Track routine repeatedly changes the parameters in response to mouse movement and invokes the Draw routine. The Zooming History Controller display is redrawn once more with the secondary parameters restored to normal. The mouse behavior is restored to controlling the cursor position.

A copy of a software computer code "© Apple Computer, Incorporated" for the Zooming History Controller written for the Macintosh IIfx™ computer is contained in Appendix A.

An Alternative Embodiment—Zooming Videodisk Controller

Figure 10:
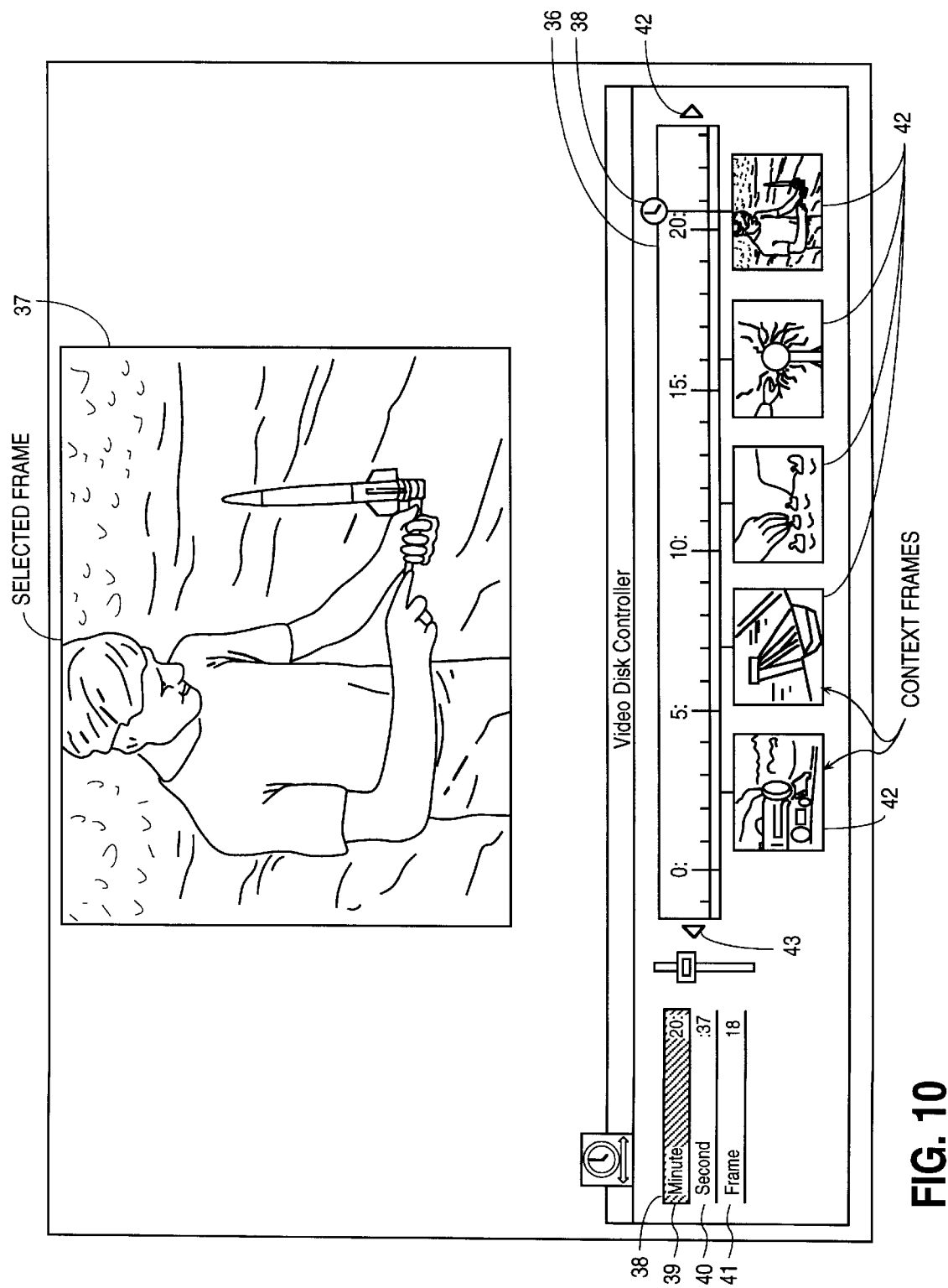
FIG. 10 shows an alternate embodiment of the present invention as applied to videodisks, the Zooming Videodisk Controller.

FIG. 10 shows an alternative embodiment of the present invention as applied to videodisks, the Zooming Videodisk Controller "© Apple Computer, Incorporated". Basically, the Zooming Videodisk Controller operates in the same manner as the Zooming History Controller described above, with the following distinctions.

Similar to the Zooming History Controller, the user controls the time scale. However, in the Zooming Videodisk Controller, the user controls the selection of a video frame within that time scale, instead of a time unit.

The scale is controlled in the same manner as described in the Zooming History Controller (i.e., scale slider 39 and vertical mouse movements disassociated from the cursor). An individual frame within that scale is selected in the same manner as a particular time unit was selected in the Zooming History Controller (i.e., manipulating the timeline or moving the indicator along the timeline).

In FIG. 10, timeline 36 is divided into units of time which are further subdivided into individual frames on the videodisk. Thus, the present invention enables a user to select one particular frame among thousands of frames on a videodisk. The selected time and frame is shown by the position of indicator 38 along timeline 36 and also displayed by column of fields 38. Column of fields 38 is comprised of rows 39–41. Row 39 is the "Minute" field and displays the currently selected minute in reference to the start of the videodisk. Row 40 is the "Second" field and displays the currently selected seconds in reference to the minutes. Row 41 is the "Frame" field and displays the currently selected frame in reference to the minutes and seconds. Another embodiment is to include an "Hour" row in the column of fields, in the case of longer videodisks. In FIG. 10, the currently selected frame corresponds to 20 minutes, 37 seconds and 16 frames into the videodisk, "20:37:16".

The frame corresponding to the selected time/frame is pulled from the videodisk and displayed above timeline 36. This is illustrated by selected frame 37. Selected frame 37 is defined by column of fields 38 and the position of indicator 38 along timeline 36. As the user changes the selected time/frame, the corresponding frame is pulled from the videodisk and displayed.

Context frames 42 are sampled at regular intervals of the videodisk and displayed below timeline 36. Context frames 42 are displayed directly below the point of timeline 36 corresponding to their location on the timeline. Vertical line segments connect context frames 42 to the corresponding point where they are located on timeline 36. Context frames 42 are used to give the user a reference point as to the section of the videodisk which is represented by that section of the timeline. Context frames 42 scroll in concert with timeline 36 and adjust according to the scale. If the user positions the cursor over a context frame 42 and "clicks" the mouse button, the Zooming Videodisk Controller responds in the same manner as when timeline 36 is "clicked", with one exception. When the mouse is moved horizontally, both indicator 38 and timeline 36 track the mouse's movements. In one embodiment, a graphic representation of the number of video frames between a pair of context frames 42 is shown to inform the user how much real time lies between that pair of context frames. In another embodiment, a graphic representation of the entire disk with a highlight of the timeline portion is used to inform the user what part of the video disk the current selected frame 37 resides in.

One aspect of the Zooming Videodisk Controller is that it can be used to perform functions similar to the "jog/shuttle" functions found on some high-end videotape decks. To scan over a video sequence, the user can zoom in (i.e., decrease the scale) so that the whole scene is covered in timeline 36. The user accomplishes this by adjusting the scale in reference to context frames 42. Indicator 38 is then dragged across timeline 36 to simulate the "jog" control, but at an adjustable scale.

The "shuttle" function is simulated by positioning indicator 38 to the beginning of the scene. Then, right scroll arrow icon 42 is selected via the mouse. The scene "plays" as selected frames 37 are successively displayed. The scene "plays" at the rate determined by the current scale and the current scroll speed. The scene can be "played" in reverse by selecting left scroll arrow icon 43. The user can also "freeze frame" by changing the scroll speed to zero.

Figure 11:
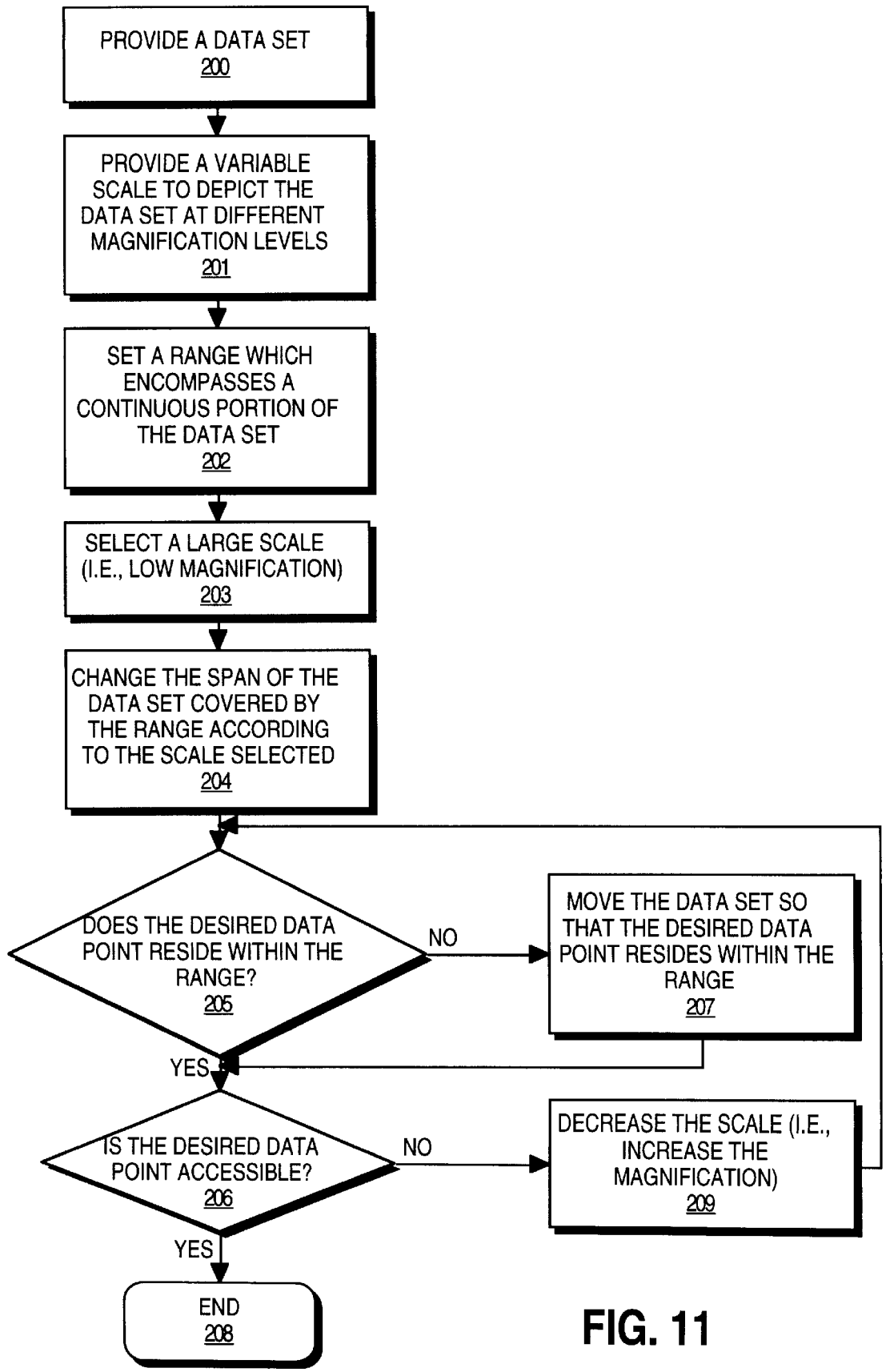
FIG. 11 shows a flow chart of the preferred embodiment.

A preferred embodiment of the present invention will now be described by referring to the flowchart shown in FIG. 11. The first step 200 is to provide a data set (e.g., musical composition, film, textual document, etc.) to the computer system. Next, in step 201, a variable scale is provided to the user. The y-axis of a mouse is remapped so that instead of controlling the vertical position of a cursor, vertical mouse movement controls the scale. As the scale is increased or decreased, the magnification level decreases or increases, respectively. In addition, a range is provided to display continuous portions of the data set to the user in step 202. What is depicted by the range is dependent on the scale selected. The range will span a broad portion of the data set for a large scale. However, the resolution will be low. Conversely, if the scale is reduced, the magnification level increases and narrower portions of the data set are depicted by the range. As the scale is reduced, the resolution increases. The range can be made to cover different portions of the data set for a given scale. This is accomplished by remapping the x-axis of the mouse so that instead of controlling the horizontal position of a cursor, horizontal mouse movement controls what portion of the data set is covered by the range.

In order to access a desired data point within a broad data set, the user starts in step 203 by selecting a relatively large scale. In step 204, the computer will change the span of the data set covered by the range according to the scale selected. Next, the user determines in step 205 whether the desired data point resides within the portion of the data set as depicted by the range. If so, then step 207 may be skipped. Otherwise, step 207 requires the user to move the data set relative to the range so that the desired data point resides within the portion depicted by the range. This is typically done by moving the cursor positioning device (e.g. mouse) in a horizontal direction. Afterwards, a decision must be made in step 206. Is the desired data point accessible? If the answer is "yes", then the desired data point is accessed and that is the end (step 208). If the answer is "no", then the scale must be decreased (as shown by step 209 by moving the cursor positioning device in a vertical direction) and the procedure must be repeated, starting back from step 205 until the scale is decreased enough so that the desired data point is accessible.

```
                                                                        04860.P539
History.c                   APPENDIX A                                  Page 1
Wednesday, February 27, 1991  12:52 PM define PROFILE      0                  /* Set to use THINK profiler */ define KERNS_HACK   0                  /* Displays a context frame per pixel -- reall if PROFILE
include "stdio.h"
endif include "Color.h"
include "ColorToolbox.h"
#include "CrsrLock.h"
#include "TimeMath.h"
#include "Player.h"
#include "Offscreen.h"
#include "Cache.h"
#include "Wheel.h"

define nil          0 define ABS(x)       (((x) >= 0) ? (x) : -(x))

define mApple       128                 /* MENU resource IDs */
#define mFile        129
#define mOptions     130
define mPlayer      131 define appleAbout   1                   /* Apple menu items */ define fileQuit     1                   /* File menu items */ define optOKZoom    1                   /* Options menu items */
define optNoZoom    2
#define optHistory   4
#define optVideo     5
#define optGryDbl    7
#define optWhtDbl    8
#define optWhlZoom   10
define optWhlScrl   11 define playNone     1                   /* Player menu items */
define playAnim     2
#define play4200     3
#define playDig      5

/* Starting places for the value fields */ define H0_VAL       16                  /* Label horizontal position */
define H1_VAL       116                 /* Value horizontal position */ define D_VAL        15                  /* Vertical spacing */ define T_VAL        47                  /* The top-most selection box */
```

```
History.c                                                                    Page 2
Wednesday, February 27, 1991  12:52 PM define B_VAL       61
define L_VAL       14
define R_VAL       117 define BL_VAL      3                       /* Offset from bottom to baseline */ define DEC_H       (L_VAL-3)               /* The decrement button for the top value */
define DEC_V       INC_V define INC_H       (R_VAL+3)               /* The increment button for the top value */
define INC_V       (T_VAL+B_VAL+1 >> 1)

/* The elevator */ define ELEV_H      141                     /* Position */
define ELEV_WIDE   5                       /* Width */
#define ELEV_EXTRA  4                       /* Extra pixels at top and bottom of elevator
define ELEV_BUTTON (ELEV_EXTRA+1)          /* Offsets to incr/decr arrows */ define UNDO_ELEV   30                      /* Drag off dist for undo */

/* The timeline field */ define FIELD_T     47                      /* The field box */
define FIELD_B     78
#define FIELD_L     169
define FIELD_R     599 define FIELD_LLIM  (FIELD_L+10)            /* Range of acceptable indicator positions */
define FIELD_RLIM  (FIELD_R-10)

/* The context frames */ define CTXT_CNT    20                      /* Maximum number of context frames */ define CTXT_WIDE   64                      /* Size of a context frame */
define CTXT_HIGH   48 define CTXT_SPACE  (CTXT_WIDE+1)           /* Minimum spacing */ define CTXT_T      87                      /* Screen area for the context frames */
define CTXT_B      135
#define CTXT_L      FIELD_L
define CTXT_R      FIELD_R /* The scroll buttons */ define LSCROLL_H   (FIELD_L-5)
define LSCROLL_V   ((FIELD_T+FIELD_B+1) >> 1)

#define BUTTON_MSE  (0 << 4)                /* Offset for mouse arrow */
#define BUTTON_WHL  (1 << 4)                /* Offset for thumbwheel arrow */

/* Button settings -- display modifiers */
```

```
History.c                                                          Page 3
Wednesday, February 27, 1991   12:52 PM define RSCROLL_H      (FIELD_R+5)
define RSCROLL_V      ((FIELD_T+FIELD_B+1) >> 1)

/* The off-screen size of the window */ define COPY_T    35
define COPY_B    148
#define COPY_L    3
#define COPY_R    619

/* The timeline area */ define CLIP_T    COPY_T
define CLIP_B    COPY_B
#define CLIP_L    FIELD_L
define CLIP_R    FIELD_R /* The playback frame -- global coordinates */ define FRAME_K    80                /* 1/4 of plaback frame width */ define FRAME_T    (FRAME_B  - 3*FRAME_K)
define FRAME_B    (-32)
#define FRAME_L    ((640>>1) - 2*FRAME_K)
#define FRAME_R    (FRAME_L  + 4*FRAME_K)

/* Button cursor IDs and offsets for variations */ define BUTTON_BASE 4000             /* Base CRSR resource ID */
define NR_BUTTON   32 define BUTTON_UP   (0 << 0)         /* Offsets for directions */
define BUTTON_DN   (1 << 0)
#define BUTTON_LT   (2 << 0)
#define BUTTON_RT   (3 << 0)

#define BUTTON_NORM (0 << 2)         /* Offset for normal, unlimited */
define BUTTON_LIM  (1 << 2)         /* Offset for value at bound */ define BUTTON_SM   (0 << 3)         /* Offset for small arrow (unclickable) */
define BUTTON_LG   (1 << 3)         /* Offset for large arrow (clickable) */ define BUTTON_MSE  (0 << 4)         /* Offset for mouse arrow */
define BUTTON_WHL  (1 << 4)         /* Offset for thumbwheel arrow */

/* Button settings -- display modifiers */
```

```c
History.c                                                           Page 4
Wednesday, February 27, 1991  12:52 PM define IS_INC        (0 << 0)         /* This is the increment button */
define IS_DEC        (1 << 0)         /* This is the decrement button */ define COLOR_BLK     (0 << 1)         /* Color set for the button */
define COLOR_RED     (1 << 1)

#define SHOW_NONE     (0 << 2)         /* Don't show any buttons */
#define SHOW_EMPTY    (1 << 2)         /* Show both buttons hollow */
#define SHOW_INC      (2 << 2)         /* Show incr button filled, decr hollow */
define SHOW_DEC      (3 << 2)         /* Show decr button filled, incr hollow */ define LIM_NONE      (0 << 4)         /* Show both buttons unbounded */
define LIM_INC       (1 << 4)         /* Show incr button bounded */
#define LIM_DEC       (2 << 4)         /* Show decr button bounded */

/* Some other stuff */ define INCR_COUNT    8                /* Pixels of mouse travel before value increme define TIC_WIDTH     2                /* Minimum spacing for tick marks */
define LBL_WIDTH     32               /* Minimum spacing for labels */ define ZOOM_NUM      33               /* Ratio for mouse travel to scale change */
define ZOOM_DNM      32 define FRAMES_SEC    30               /* Hardwired frames-per-second */ typedef struct {                       /* Some constants for the value fields */
    Rect    box;                       /* The selection box */
    Point   decr;                      /* The decrement button */
    Point   incr;                      /* The increment button */
    TSpan   span;                      /* Span at the bottom of this value */
} TValue;

typedef struct {                       /* A context frame */
    Rect    box;                       /* The frame box */
    TTime   time;                      /* Time for the frame */
} TContext;

/* Labelling and tick mark frequency tables */ typedef struct {
    int     idx;                       /* What are the units? */
    int     cnt;                       /* How many units to skip? */
} TIncr;

TIncr    LblIncr[] = {
    {IDX_USEC,  1   },
```

```
History.c                                                                   Page 5
Wednesday, February 27, 1991 12:52 PM {IDX_USEC,    5    },
        {IDX_USEC,   10    },
        {IDX_USEC,   50    },
        {IDX_USEC,  100    },
        {IDX_USEC,  500    }, {IDX_MSEC,   33    },
        {IDX_MSEC,  100    },
        {IDX_MSEC,  500    }, {IDX_SEC,    1    },
        {IDX_SEC,    5    },
        {IDX_SEC,   10    },
        {IDX_SEC,   20    }, {IDX_MIN,    1    },
        {IDX_MIN,    5    },
        {IDX_MIN,   10    },
        {IDX_MIN,   20    }, {IDX_HOUR,   1    },
        {IDX_HOUR,   2    },
        {IDX_HOUR,   4    },
        {IDX_HOUR,  12    }, {IDX_DAY,    1    },
        {IDX_DAY,    2    },
        {IDX_DAY,    4    },
        {IDX_DAY,    8    },

{IDX_MNTH,   1    },
        {IDX_MNTH,   2    },
        {IDX_MNTH,   4    },

{IDX_YEAR,   1    },
        {IDX_YEAR,   5    },
        {IDX_YEAR,  10    },
        {IDX_YEAR,  50    },
        {IDX_YEAR, 100    },
        {IDX_YEAR, 500    }
};

TIncr      TicIncr[] = {
        {IDX_USEC,   1    },
        {IDX_USEC,  10    },
        {IDX_USEC, 100    },
        {IDX_MSEC,  33    },
        {IDX_SEC,    1    },
        {IDX_MIN,    1    },
        {IDX_HOUR,   1    },
        {IDX_DAY,    1    },
        {IDX_MNTH,   1    },
```

```
History.c                                                                Page 6
Wednesday, February 27, 1991  12:52 PM

{IDX_YEAR,  1   }
};

/* Unchanging variables */

Boolean     Running;                    /* Set while History is running */

MenuHandle  MenuApple;                  /* The menus */
MenuHandle  MenuFile;
MenuHandle  MenuOptions;
MenuHandle  MenuPlayer;

WindowPtr   MyWindow;                   /* The window covering the screen */
CGrafPort   BackPort;                   /* The offscreen pix-map */

PicHandle   BackPic;                    /* Background tile */
PicHandle   WindPic;                    /* Window frame */

Rect        TotalBox;                   /* Destination box for WindPic */

TWheel      Wheel;                      /* Globals for the thumbwheel */

PatHandle   Stripes;                    /* Pattern to put behind the value fields */

CursHandle  EmptyCrsr;                  /* Invisible cursor */
CursHandle  LScrollCrsr[10];            /* Variable-speed scrolling cursors */
CursHandle  RScrollCrsr[10];

CursHandle  ElevKnob;                   /* Elevator knob (stored as cursor ) */
CursHandle  Indicator[IDX_CNT];         /* Indicators    (stored as cursors) */
CursHandle  ButtonCrsr[NR_BUTTON];      /* Buttons       (stored as cursors) */

/* Drawing constants for current units */ int         UnitHeight[IDX_CNT];        /* Tick mark heights, by unit */
TValue      Value[IDX_CNT];             /* Info for the value fields (set by InitBreak TSpan       MinSpan;                    /* Greatest magnification */
TSpan       MaxSpan;                    /* Broadest scale */ int         ElevTop;                    /* Vertical range of the elevator knob */
int         ElevBot;

int         HiUnit;                     /* Units of the  biggest value field */
int         LoUnit;                     /* Units of the smallest value field */

TTime       LoTime;                     /* Left  bound on the timeline */
TTime       HiTime;                     /* Right bound on the timeline */ int         FieldL;                     /* Stopping points for drawing */
int         FieldR;                     /* (beyond FIELD_L/R to show partial context f
```

```
History.c                                                                    Page 7
Wednesday, February 27, 1991 12:52 PM /* Drawing parameters -- current settings */ int        CurrPos;                  /* Position of the indicator */
TTime      CurrTime;                 /* Time at the left edge of the indicator */
TSpan      CurrSpan;                 /* Time spanned by a single pixel */

/* Drawing parameters -- button appearances */ int        ShowScrollButtons;        /* The scroll buttons */
int        ShowElevButtons;          /* Indicators on the magnification slider */
int        ShowValButtons;           /* Indicators on the current time field */ int        ShowIndicHilite;          /* Highlight the indicator? */
int        ShowElevHilite;           /* Highlight the magnification knob? */

/* Options menu settings */ int        ScrollZoom  = 1;
int        IsHistory   = 1;
int        GrayDisable = 1;
int        WheelZoom   = 0;
int        WheelScroll = 0;

/* Drawing side-effects */ int        LblIdx;                   /* Frequency of the timeline labels (from LblI
int        LblCnt;

int        TicIdx;                   /* Frequency of the tick marks (from TicIncr)
int        TicCnt;

int        LoRange;                  /* Timeline bounds on the screen */
int        HiRange;

TTime      ExactTime;                /* Time exactly under the indicator */
TTime      CurrCtxt;                 /* Context frame closest to the indicator */
int        FillItIn;                 /* Did any context frame need to be drawn? */

Fixed      ZoomOut;                  /* Ratio for mouse   upward to scale change */
Fixed      ZoomIn;                   /* Ratio for mouse downward to scale change */ int        NrContext = 0;            /* The context frames */
TContext   Context[CTXT_CNT];

/* The colors */
```

```
History.c                                                                    Page 8
Wednesday, February 27, 1991  12:52 PM RGBColor    RGBWhite  = {0xFFFF, 0xFFFF, 0xFFFF};
RGBColor    RGBVeryLt = {0xC000, 0xC000, 0xC000};
RGBColor    RGBLight  = {0xA000, 0xA000, 0xA000};
RGBColor    RGBGray   = {0x8000, 0x8000, 0x8000};
RGBColor    RGBDark   = {0x4000, 0x4000, 0x4000};
RGBColor    RGBBlack  = {0x0000, 0x0000, 0x0000};

RGBColor    RGBRed    = {0xCCCC, 0x0000, 0x3333};
RGBColor    RGBPink   = {0xFFFF, 0x9999, 0x9999};
RGBColor    RGBLtBlue = {0xCCCC, 0xCCCC, 0xFFFF};
RGBColor    RGBMdBlue = {0x9999, 0x9999, 0xCCCC};
RGBColor    RGBDkBlue = {0x3333, 0x3333, 0x6666};

/* Normal/highlighted colors for elevator knob and indicator */

RGBColor*   HiliteFore[2] = {&RGBRed, &RGBRed};
RGBColor*   HiliteBack[2] = {&RGBWhite, &RGBPink};

/* Some constant Rects */

Rect        FieldBox = {FIELD_T,   FIELD_L,   FIELD_B,   FIELD_R};
Rect        CopyBox  = { COPY_T,    COPY_L,    COPY_B,    COPY_R};
Rect        ClipBox  = { CLIP_T,    CLIP_L,    CLIP_B,    CLIP_R};
Rect        FrameBox = {FRAME_T,   FRAME_L,   FRAME_B,   FRAME_R};
Rect        CtxtBox  = { CTXT_T,    CTXT_L,    CTXT_B,    CTXT_R};

/* Clickable buttons */

Rect        LScrollBox = {0, 0, 0, 0};
Rect        RScrollBox = {0, 0, 0, 0};
Rect        IndicBox   = {0, 0, 0, 0};
Rect        KnobBox    = {0, 0, 0, 0};
Rect        ElevBox    = {0, 0, 0, 0};

/* ============================ */
/* ===== THE VIDEO WINDOW ===== */
/* ============================ */

/* UpdateVideo keeps the video window up-to-date */
void UpdateVideo (int doIt)
{
    TTime       time;

static TTime prevExact;

if (!IsHistory) {
        PollPlayer (time);

if (CmpTime (prevExact, ExactTime) != 0) {
```

```
History.c                                                                    Page 9
Wednesday, February 27, 1991  12:52 PM if (GrabFrame (ExactTime, doIt, MyWindow, &FrameBox))
                CopyTime (prevExact, ExactTime);
        }
    }
}

/* ============================== */
/* ===== DETERMINING UNITS ===== */
/* ============================== */

/* ChooseIncr chooses the smallest increment that allows width pixels between hits */
void ChooseIncr (TIncr *incr, int width, int *idx, int *cnt, int limIdx, int limCnt)
{
    TSpan   target;
    TSpan   test;
    int     i;
    int     c;

target = CurrSpan;
    MulSpan (&target, Long2Fix (width));

do {
        i = incr->idx;
        c = incr->cnt;
        incr++;

SetSpan (&test, Long2Fix (c), i);
    } while (  i > limIdx ||
               i == limIdx && c < limCnt ||
               CmpSpan (&target, &test) > 0);

*idx = i;
    *cnt = c;
}

/* ======================= */
/* ===== SCALE UNITS ===== */
/* ======================= */

/* HistoryUnits sets up the drawing parameters for years..seconds */
void HistoryUnits ()
{
    DateTimeRec     dt;

SetSpan (&MinSpan, FixDiv (1, 60), IDX_SEC);
    SetSpan (&MaxSpan, FixDiv (1,  4), IDX_YEAR);

LoUnit = IDX_YEAR;
    HiUnit = IDX_SEC;

CopyTime (LoTime, MinTime);
```

History.c                                                                        Page 10
Wednesday, February 27, 1991  12:52 PM

```
        GetTime (&dt);
        DTToTime (&dt, HiTime);

CurrPos = 3*FIELD_R + FIELD_L >> 2;
        CopyTime (CurrTime, HiTime);
        CopyTime (CurrCtxt, CurrTime);

UnitHeight[IDX_YEAR] = -16;
        UnitHeight[IDX_MNTH] = -13;
        UnitHeight[IDX_DAY ] = -10;
        UnitHeight[IDX_HOUR] = -7;
        UnitHeight[IDX_MIN ] = -4;
        UnitHeight[IDX_SEC ] = -2;
        UnitHeight[IDX_MSEC] = -1;
        UnitHeight[IDX_USEC] = -0;

FieldL = FIELD_L - LBL_WIDTH;
        FieldR = FIELD_R;

DisableItem (MenuPlayer, 0);
        DrawMenuBar ();
}

/* VideoUnits sets up the drawing parameters for hours..mSec */
void VideoUnits ()
{
        DateTimeRec     dt;
        TSpan           span;
        int             wide;

SetSpan (&MinSpan, FixDiv (1000, FRAMES_SEC*(CTXT_SPACE+8)), IDX_MSEC);
        SetSpan (&MaxSpan, FixDiv (8100, FIELD_R-FIELD_L+1), IDX_SEC);

LoUnit = IDX_MIN;
        HiUnit = IDX_MSEC;

GetTime (&dt);
        DTToTime (&dt, LoTime);

LoTime[IDX_HOUR] = 20;
        LoTime[IDX_MIN ] = MinTime[IDX_MIN ];
        LoTime[IDX_SEC ] = MinTime[IDX_SEC ];
        LoTime[IDX_MSEC] = MinTime[IDX_MSEC];

GetPlayerSpan (&span);
        CopyTime (HiTime, LoTime);
        TimePlusSpan (HiTime, &span);

CurrPos = FIELD_LLIM;
        CopyTime (CurrTime, LoTime);
        CopyTime (CurrCtxt, CurrTime);
```

```
History.c                                                              Page 11
Wednesday, February 27, 1991  12:52 PM UnitHeight[IDX_YEAR] = -18;
    UnitHeight[IDX_MNTH] = -17;
    UnitHeight[IDX_DAY ] = -16;
    UnitHeight[IDX_HOUR] = -15;
    UnitHeight[IDX_MIN ] = -11;
    UnitHeight[IDX_SEC ] = -7;
    UnitHeight[IDX_MSEC] = -3;
    UnitHeight[IDX_USEC] = -1;

wide = CTXT_WIDE >> 1;
    FieldL = FIELD_L - ((wide > LBL_WIDTH) ? wide : LBL_WIDTH);
    FieldR = FIELD_R + wide;

EnableItem (MenuPlayer, 0);
    DrawMenuBar ();
}

/* FindBreak sets CurrSpan to the time span that changes between highlighting idx unit
/* and the next lower units. */
void FindBreak (int idx)
{
    TSpan       hi;
    TSpan       lo;
    int         i;

hi = MaxSpan;
    lo = MinSpan;

for (i = 0; i < 40; i++) {
        /* Find the midpoint between hi and lo */
        CurrSpan = hi;
        AddSpan (&CurrSpan, &lo);
        MulSpan (&CurrSpan, 0x00008000);

/* Find the highlighted units at that span */
        ChooseIncr (TicIncr, TIC_WIDTH, &TicIdx, &TicCnt, IDX_HLIM, 1);
        ChooseIncr (LblIncr, LBL_WIDTH, &LblIdx, &LblCnt, TicIdx, TicCnt);

/* Reduce the search space */
        if (LblIdx <= idx)
            hi = CurrSpan;
        else
            lo = CurrSpan;
    }
}

/* InitBreak sets up the Value array, and finds the division in scale between the unit
void InitBreak ()
{
    Rect        box;
```

```
History.c                                                                        Page 12
Wednesday, February 27, 1991  12:52 PM Point       decr;
        Point       incr;
        TValue      *val;
        int         idx;

box.top    = T_VAL;
        box.left   = L_VAL;
        box.bottom = B_VAL;
        box.right  = R_VAL;

decr.v = DEC_V;
        decr.h = DEC_H;

incr.v = INC_V;
        incr.h = INC_H;

val = &Value[LoUnit];
        for (idx = LoUnit; idx <= HiUnit; idx++) {
            FindBreak (idx);

val->box  = box;
            val->decr = decr;
            val->incr = incr;
            val->span = CurrSpan;

box.top    += D_VAL;
            box.bottom += D_VAL;
            decr.v     += D_VAL;
            incr.v     += D_VAL;

val++;
        }
}

/* ElevRange returns the range of elevator position (in pixels) for the given units */
void ElevRange (int units, int *top, int *bot)
{
    *top = Value[units].box.top-1;
    *bot = Value[units].box.bottom;
}

/* GetUnitSpan returns the high and low span limits for the given units */
void GetUnitSpan (int unit, TPSpan lo, TPSpan hi)
{
    TSpan       bump;

SetSpan (&bump, 0x00000010, unit);

*lo = Value[unit].span;
    AddSpan (lo, &bump);
```

History.c
Wednesday, February 27, 1991 12:52 PM

```c
        if (unit == LoUnit)
            *hi = MaxSpan;
        else
            *hi = Value[unit-1].span;
        SubSpan (hi, &bump);
}

/* SpanToElev returns the elevator knob position for the given span */
int SpanToElev (TPSpan span)
{
        int         idx;
        TSpan       numer;
        TSpan       denom;
        TValue      *val;

if (CmpSpan (span, &Value[HiUnit-1].span) <= 0) {
            idx = HiUnit;

} else {
            idx = LoUnit;
            while (CmpSpan (span, &Value[idx].span) <= 0)
                idx++;
        } numer = *span;

if (idx == LoUnit)
            denom = MaxSpan;
        else
            denom = Value[idx-1].span;

val = &Value[idx];

SubSpan (&numer, &val->span);
        SubSpan (&denom, &val->span);

return (
            val->box.bottom +
            FixMul (
                DivSpan (&numer, &denom),
                (val->box.top-1) - val->box.bottom));
}

/* GetUnitMid returns the span that puts the elevator at the middle of the given units */
void GetUnitMid (int unit, TPSpan span)
{
        TSpan       lo;
        TSpan       hi;
        int         i;
        int         pos;
```

```
History.c                                                              Page 14
Wednesday, February 27, 1991 12:52 PM lo = Value[unit].span;

if (unit == LoUnit)
        hi = MaxSpan;
    else
        hi = Value[unit-1].span;

ElevRange (unit, &i, &pos);
    pos = pos+i+1 >> 1;

for (i = 0; i < 20; i++) {
        *span = hi;
        AddSpan (span, &lo);
        MulSpan (span, 0x00008000);

if (SpanToElev (span) > pos)
            lo = *span;
        else
            hi = *span;
    }
}

/* SetUnits changes the drawing parameters history or video modes */
void SetUnits (int isHistory)
{
    IsHistory = isHistory;

if (isHistory)
        HistoryUnits ();
    else
        VideoUnits ();

InitBreak ();

ElevTop = Value[LoUnit].box.top-1;
    ElevBot = Value[HiUnit].box.bottom;

ElevBox.top    = ElevTop        -  ELEV_EXTRA;
    ElevBox.left   = ELEV_H         - (ELEV_WIDE >> 1);
    ElevBox.bottom = ElevBot        +  ELEV_EXTRA+1;
    ElevBox.right  = ElevBox.left   +  ELEV_WIDE;

CurrSpan = MaxSpan;
}

/* ================================== */
/* ===== CONVERT UNIT TO STRING ===== */
/* ================================== */

/* These procedures have the same parameters, and are collected into an array below. *
/* Each takes the appropriate unit from the time value and converts it to a short or *
```

```
History.c                                                              Page 15
Wednesday, February 27, 1991  12:52 PM /* long string, as given by the full parameter.  Full is passed true for the value */
/* fields, and false for the timeline labels. */

/* NOTE: The full parameter could probably be eliminated -- it only makes a slight */
/*       difference in the hours field (12 pm vs. Noon) */ void StrUSec (TPTime time, char *s, int full)
{
    sprintf (s, "x[%03i]", time[IDX_USEC]);
} void StrMSec (TPTime time, char *s, int full)
{
    sprintf (s, "x%i", time[IDX_MSEC] * FRAMES_SEC / 1000 + 1);
} void StrSec (TPTime time, char *s, int full)
{
    sprintf (s, "x:%02i", time[IDX_SEC]);
} void StrMin (TPTime time, char *s, int full)
{
    int    val;

val = time[IDX_MIN];

if (IsHistory) {
        sprintf (s, "x:%02i:", val);

} else {
        val += (time[IDX_HOUR]-20)*60;
        sprintf (s, "x%i:", val);
    }
} void StrHour (TPTime time, char *s, int full)
{
    int    val;

if (IsHistory) {
        val = time[IDX_HOUR];

if (full) {
            if      (val ==  0) strcpy (s, "x12 am");
            else if (val == 12) strcpy (s, "x12 pm");
            else if (val <  12) sprintf (s, "x%i am", val);
            else                sprintf (s, "x%i pm", val-12);
        } else {
```

```
History.c                                                                Page 16
Wednesday, February 27, 1991 12:52 PM if      (val == 0)  strcpy  (s, "x12am");
            else if (val == 12) strcpy  (s, "xNoon");
            else if (val <  12) sprintf (s, "x%iam", val);
            else                sprintf (s, "x%ipm", val-12);
        }

} else {
        StrMin (time, s, full);
    }
} void StrDay (TPTime time, char *s, int full)
{
    int     val;

/* Read down...                     11111111112222222222233 */
    /*                        012345678901234567890123456789012345678901 */
    static char dayTag1[32] = "-snrttttttttttttttttttttnrttttttts";
    static char dayTag2[32] = "-tddhhhhhhhhhhhhhhhhhhhhddhhhhhhht";

val = time[IDX_DAY];

sprintf (s, "x%i%c%c", val, dayTag1[val], dayTag2[val]);
} void StrMnth (TPTime time, char *s, int full)
{
    static char monthLabel[13][16] = {
        "x---",
        "xJanuary",
        "xFebruary",
        "xMarch",
        "xApril",
        "xMay",
        "xJune",
        "xJuly",
        "xAugust",
        "xSeptember",
        "xOctober",
        "xNovember",
        "xDecember"
    };

strcpy (s, monthLabel[time[IDX_MNTH]]);

if (1 || !full)
        s[4] = 0;
} void StrYear (TPTime time, char *s, int full)
```

History.c                                                                                          Page 17
Wednesday, February 27, 1991  12:52 PM

```c
{
    sprintf (s, "x%i", time[IDX_YEAR]);
} typedef void (*TCvtStr) ();
TCvtStr CvtStr[IDX_CNT] = {StrYear, StrMnth, StrDay, StrHour, StrMin, StrSec, StrMSec, /* ================================ */
/* ===== DRAW THE UNIT FIELD ===== */
/* ================================ */

/* DrawValues draws the value fields and labels into the offscreen (current) port. */
/* It highlights the currently labelled units, and dims the finer units. */
void DrawValues ()
{
    Rect        r;
    TValue      *val;
    int         idx;
    RGBColor    *c0;
    RGBColor    *c1;
    RGBColor    *c2;
    char        s[16];

static char unitLabel[IDX_CNT][16] = {
        "\pYear",
        "\pMonth",
        "\pDay",
        "\pHour",
        "\pMinute",
        "\pSecond",
        "\pFrame",
        "\pµSec",
    };

r = Value[LoUnit].box;
    r.top -= 1;
    r.bottom = Value[HiUnit].box.bottom+1;

RGBForeColor (&RGBDkBlue);
    FillRect (&r, *Stripes);

TextFace (bold);

val = &Value[LoUnit];
    for (idx = LoUnit; idx <= HiUnit; idx++) {
        /* Find the label, value and background colors */
        if (LblIdx < idx) {
            /* Dimmed */
            c0 = &RGBLight;
            c1 = &RGBLight;
            c2 = &RGBWhite;
```

History.c                                                                                             Page 18
Wednesday, February 27, 1991 12:52 PM

```
        } else if (LblIdx > idx) {
            /* Normal */
            c0 = &RGBDkBlue;
            c1 = &RGBBlack;
            c2 = &RGBWhite;

} else {
            /* Highlighted */
            c0 = &RGBDkBlue;
            c1 = &RGBBlack;
            c2 = &RGBLtBlue;
        }

/* Erase the field with the background color */
        RGBForeColor (c2);
        PaintRect (&val->box);

/* Draw in the label */
        RGBForeColor (c0);
        MoveTo (H0_VAL, val->box.bottom-BL_VAL);
        DrawString (unitLabel[idx]);

/* Find the value string */
        CvtStr[idx] (ExactTime, s, 1);
        s[0] = strlen (s) - 1;

/* Draw in the value */
        RGBForeColor (c1);
        MoveTo (H1_VAL - StringWidth (s), val->box.bottom-BL_VAL);
        DrawString (s);

/* Bump to the next one */
        val++;
    }
}

/* ========================== */
/* ===== CONTEXT FRAMES ===== */
/* ========================== */

/* SetUpCtxt moves CurrCtxt just beyond CurrTime, and computes the span between contex
/* frames that it appropriate for CurrSpan. */
void SetUpCtxt (TPSpan ctxtSpan)
{
    TSpan       lim;

/* Find the appropriate span between context frames */
    lim = CurrSpan;
    MulSpan (&lim, Long2Fix (CTXT_SPACE));

SetSpan (ctxtSpan, FixDiv (1, FRAMES_SEC), IDX_SEC);
```

History.c                                                                  Page 19
Wednesday, February 27, 1991 12:52 PM

```c
        while (CmpSpan (ctxtSpan, &lim) < 0)
            MulSpan (ctxtSpan, 0x00020000);

/* Move CurrCtxt to just beyond CurrTime */
        while (CmpTime (CurrCtxt, CurrTime) >= 0)
            TimeMinusSpan (CurrCtxt, ctxtSpan);

do {
            TimePlusSpan (CurrCtxt, ctxtSpan);
        } while (CmpTime (CurrCtxt, CurrTime) < 0);
}

/* DrawCtxtFrame draws a context frame at pos and requests the frame from the cache. */
/* It notes a cache failure by setting FillItIn to true, which will cause redrawing */
/* until all the frames are drawn. */
void DrawCtxtFrame (TTime time, int pos)
{
    Rect        r;
    TContext    *ctxt;

/* Draw the connecting mark */
    r.top    = FIELD_B;
    r.bottom = CTXT_T;

r.left   = pos-1;
    r.right  = pos+2;

RGBForeColor (&RGBLtBlue);
    PaintRect (&r);

r.left   = pos;
    r.right  = pos+1;

RGBForeColor (&RGBDkBlue);
    PaintRect (&r);

/* Draw the frame */
    r.top    = CTXT_T;
    r.bottom = CTXT_B;

r.left   = pos - (CTXT_WIDE >> 1);
    r.right  = r.left + CTXT_WIDE;

RGBForeColor (&RGBBlack);
    if (CacheFrame (time, thePort, &r)) FillItIn = 1;

/* Remember this frame */
    ctxt = &Context[NrContext++];

ctxt->box = r;
    CopyTime (ctxt->time, time);
```

```
History.c                                                              Page 20
Wednesday, February 27, 1991  12:52 PM

}

/* ============================ */
/* ===== DRAW THE CONTROLLER ===== */
/* ============================ */

/* DrawCursor draws crsr at (h,v).  If r is not nil then it is set to the bounding */
/* box of the cursor image. */
void DrawCursor (CursHandle crsr, int h, int v, Rect *r)
{
    Rect        bbox;
    BitMap      crsrBits;

/* Find where to draw it */
    bbox.top    = v - (**crsr).hotSpot.v;
    bbox.left   = h - (**crsr).hotSpot.h;
    bbox.bottom = bbox.top  + 16;
    bbox.right  = bbox.left + 16;

if (r) *r = bbox;

/* Poke out the mask in the background color */
    crsrBits.baseAddr = (Ptr) (**crsr).mask;
    crsrBits.rowBytes = 2;
    crsrBits.bounds = bbox;

CopyBits (
        &crsrBits, &thePort->portBits,
        &bbox, &bbox,
        srcBic, nil);

/* Draw in the data in the foreground color */
    crsrBits.baseAddr = (Ptr) (**crsr).data;

CopyBits (
        &crsrBits, &thePort->portBits,
        &bbox, &bbox,
        srcOr, nil);
}

/* DrawButton draws a button (cursor) at the given coordinates, returning its */
/* bounding box in r≠nil.  The cursor that is drawn depends on settings. */
void DrawButton (int crsrID, int settings, int h, int v, Rect *r)
{
    typedef struct {
        int         limit;
        RGBColor    *fore;
        RGBColor    *back;
    } TSetting, *TPSetting;

static TSetting settingMap[] = {
```

```
History.c                                                                      Page 21
Wednesday, February 27, 1991 12:52 PM /*       LIM_    SHOW_   COLOR_  IS_
        /* [0]   NONE    NONE    BLK     INC     */      {BUTTON_NORM, &RGBBlack , &RGBWhit
        /* [1]   NONE    NONE    BLK     DEC     */      {BUTTON_NORM, &RGBBlack , &RGBWhit
        /* [2]   NONE    NONE    RED     INC     */      {BUTTON_NORM, &RGBRed   , &RGBWhit
        /* [3]   NONE    NONE    RED     DEC     */      {BUTTON_NORM, &RGBRed   , &RGBWhit
        /* [4]   NONE    EMPTY   BLK     INC     */      {BUTTON_NORM, &RGBBlack , &RGBWhit
        /* [5]   NONE    EMPTY   BLK     DEC     */      {BUTTON_NORM, &RGBBlack , &RGBWhit
        /* [6]   NONE    EMPTY   RED     INC     */      {BUTTON_NORM, &RGBRed   , &RGBWhit
        /* [7]   NONE    EMPTY   RED     DEC     */      {BUTTON_NORM, &RGBRed   , &RGBWhit
        /* [8]   NONE    INC     BLK     INC     */      {BUTTON_NORM, &RGBBlack , &RGBGray
        /* [9]   NONE    INC     BLK     DEC     */      {BUTTON_NORM, &RGBBlack , &RGBWhit
        /* [10]  NONE    INC     RED     INC     */      {BUTTON_NORM, &RGBRed   , &RGBPink
        /* [11]  NONE    INC     RED     DEC     */      {BUTTON_NORM, &RGBRed   , &RGBWhit
        /* [12]  NONE    DEC     BLK     INC     */      {BUTTON_NORM, &RGBBlack , &RGBWhit
        /* [13]  NONE    DEC     BLK     DEC     */      {BUTTON_NORM, &RGBBlack , &RGBGray
        /* [14]  NONE    DEC     RED     INC     */      {BUTTON_NORM, &RGBRed   , &RGBWhit
        /* [15]  NONE    DEC     RED     DEC     */      {BUTTON_NORM, &RGBRed   , &RGBPink
        /* [16]  INC     NONE    BLK     INC     */      {BUTTON_LIM , &RGBBlack , &RGBWhit
        /* [17]  INC     NONE    BLK     DEC     */      {BUTTON_NORM, &RGBBlack , &RGBWhit
        /* [18]  INC     NONE    RED     INC     */      {BUTTON_LIM , &RGBRed   , &RGBWhit
        /* [19]  INC     NONE    RED     DEC     */      {BUTTON_NORM, &RGBRed   , &RGBWhit
        /* [20]  INC     EMPTY   BLK     INC     */      {BUTTON_LIM , &RGBBlack , &RGBWhit
        /* [21]  INC     EMPTY   BLK     DEC     */      {BUTTON_NORM, &RGBBlack , &RGBWhit
        /* [22]  INC     EMPTY   RED     INC     */      {BUTTON_LIM , &RGBRed   , &RGBWhit
        /* [23]  INC     EMPTY   RED     DEC     */      {BUTTON_NORM, &RGBRed   , &RGBWhit
        /* [24]  INC     INC     BLK     INC     */      {BUTTON_LIM , &RGBBlack , &RGBGray
        /* [25]  INC     INC     BLK     DEC     */      {BUTTON_NORM, &RGBBlack , &RGBWhit
        /* [26]  INC     INC     RED     INC     */      {BUTTON_LIM , &RGBRed   , &RGBPink
        /* [27]  INC     INC     RED     DEC     */      {BUTTON_NORM, &RGBRed   , &RGBWhit
        /* [28]  INC     DEC     BLK     INC     */      {BUTTON_LIM , &RGBBlack , &RGBWhit
        /* [29]  INC     DEC     BLK     DEC     */      {BUTTON_NORM, &RGBBlack , &RGBGray
        /* [30]  INC     DEC     RED     INC     */      {BUTTON_LIM , &RGBRed   , &RGBWhit
        /* [31]  INC     DEC     RED     DEC     */      {BUTTON_NORM, &RGBRed   , &RGBPink
        /* [32]  DEC     NONE    BLK     INC     */      {BUTTON_NORM, &RGBBlack , &RGBWhit
        /* [33]  DEC     NONE    BLK     DEC     */      {BUTTON_LIM , &RGBBlack , &RGBWhit
        /* [34]  DEC     NONE    RED     INC     */      {BUTTON_NORM, &RGBRed   , &RGBWhit
        /* [35]  DEC     NONE    RED     DEC     */      {BUTTON_LIM , &RGBRed   , &RGBWhit
        /* [36]  DEC     EMPTY   BLK     INC     */      {BUTTON_NORM, &RGBBlack , &RGBWhit
        /* [37]  DEC     EMPTY   BLK     DEC     */      {BUTTON_LIM , &RGBBlack , &RGBWhit
        /* [38]  DEC     EMPTY   RED     INC     */      {BUTTON_NORM, &RGBRed   , &RGBWhit
        /* [39]  DEC     EMPTY   RED     DEC     */      {BUTTON_LIM , &RGBRed   , &RGBWhit
        /* [40]  DEC     INC     BLK     INC     */      {BUTTON_NORM, &RGBBlack , &RGBGray
        /* [41]  DEC     INC     BLK     DEC     */      {BUTTON_LIM , &RGBBlack , &RGBWhit
        /* [42]  DEC     INC     RED     INC     */      {BUTTON_NORM, &RGBRed   , &RGBPink
        /* [43]  DEC     INC     RED     DEC     */      {BUTTON_LIM , &RGBRed   , &RGBWhit
        /* [44]  DEC     DEC     BLK     INC     */      {BUTTON_NORM, &RGBBlack , &RGBWhit
        /* [45]  DEC     DEC     BLK     DEC     */      {BUTTON_LIM , &RGBBlack , &RGBGray
        /* [46]  DEC     DEC     RED     INC     */      {BUTTON_NORM, &RGBRed   , &RGBWhit
        /* [47]  DEC     DEC     RED     DEC     */      {BUTTON_LIM , &RGBRed   , &RGBPink
};

TPSetting    setting;
```

```
History.c                                                                   Page 22
Wednesday, February 27, 1991   12:52 PM setting = settingMap+settings;

RGBForeColor (setting->fore);
        RGBBackColor (setting->back);

DrawCursor (ButtonCrsr[crsrID+setting->limit], h, v, r);
}

/* DrawField draws ticks, labels and context frames from CurrPos to lim.  This code */
/* is rather touchy, and very subject to off-by-one errors caused by "<" vs. "≤". */
void DrawField (int lim, int delta, Rect *blankBox, TPSpan ctxtSpan)
{
        void        (*bump) (TPTime time, TPSpan span);
        short       *edge;
        short       *limTime;
        TTime       prev;
        TTime       curr;
        TTime       mark;
        int         pos;
        int         idx;
        int         temp;
        Str255      s;
        int         valid;
        RGBColor    *dkColor;
        RGBColor    *ltColor;
        Rect        r;

/* Start out at the current center */
        CopyTime (curr, CurrTime);
        pos = CurrPos;

CopyTime (ExactTime, CurrTime);
        CopyTime (mark, CurrCtxt);

/* Back off and find the soonest context frame */
        if (delta > 0) {
            bump = TimePlusSpan;

edge = curr;
            limTime = HiTime;

pos--;

} else {
            bump = TimeMinusSpan;

edge = prev;
            limTime = LoTime;

TimeMinusSpan (mark, ctxtSpan);
        }
```

```
History.c                                                              Page 23
Wednesday, February 27, 1991 12:52 PM /* Prepare for normal drawing */
        valid = 1;
        dkColor = &RGBBlack;
        ltColor = &RGBGray;

while (pos != lim) {
            /* Move to the next pixel */
            CopyTime (prev, curr);

(*bump) (curr, &CurrSpan);
            pos += delta;

/* What units changed? */
            idx = IDX_LLIM-1;
            do {
                idx++;
                temp = curr[idx] - prev[idx];
            } while (temp == 0 && idx <= TicIdx);

if (temp == delta) {
                /* Units just incremented */
                temp = edge[idx] - MinTime[idx];

/* At a tick mark? */
                if ((idx == TicIdx) ? temp % TicCnt == 0 : idx < TicIdx) {
                    /* Draw the label */
                    if ((idx == LblIdx) ? temp % LblCnt == 0 : idx < LblIdx) {
                        TextFace ((idx == LblIdx) ? 0 : bold);

CvtStr[idx] (edge, s, 0);
                        s[0] = strlen (s) - 1;

RGBForeColor (dkColor);
                        MoveTo (pos, FIELD_B+UnitHeight[idx]-1);
                        DrawString (s);

} else {
                        RGBForeColor (ltColor);
                    }

/* Draw the tick */
                    MoveTo (pos, FIELD_B-1);
                    Line (0, UnitHeight[idx]+1);

/* Update the exact time */
                    if (pos == CurrPos) {
                        CopyTime (ExactTime, edge);

for (temp = idx+1; temp <= IDX_HLIM; temp++)
                            ExactTime[temp] = MinTime[temp];
                    }
                }
            }
```

History.c                                                                                      Page 24
Wednesday, February 27, 1991 12:52 PM

```
        if (valid) {
            if (!IsHistory) {
                if (KERNS_HACK) {
                    /* Draw the frame that corresponds to this pixel */
                    r.top    = CTXT_T;
                    r.bottom = CTXT_B;

r.left  = pos;
                    r.right = pos+1;

if (SectRect (&r, &ClipBox, &r)) {
                        ClipRect (&r);

r.left  = pos - (CTXT_WIDE >> 1);
                        r.right = r.left + CTXT_WIDE;

RGBForeColor (&RGBBlack);
                        RGBBackColor (&RGBWhite);

if (CacheFrame (curr, thePort, &r)) FillItIn = 1;

ClipRect (&ClipBox);
                    }

} else {
                    /* Draw the context frame */
                    if (CmpTime (curr, mark) == delta) {
                        DrawCtxtFrame (mark, pos);

if (pos == CurrPos)
                            CopyTime (ExactTime, mark);

(*bump) (mark, ctxtSpan);
                    }
                }
            }

/* Have we overrun the time limits? */
            if (CmpTime (curr, limTime) == delta) {
                valid = 0;

if (GrayDisable) {
                    dkColor = &RGBLight;
                    ltColor = &RGBVeryLt;
                } else {
                    dkColor = &RGBWhite;
                    ltColor = &RGBWhite;
                } r = *blankBox;
                if (delta > 0) {
                    r.left  = pos;
```

History.c                                                                    Page 25
Wednesday, February 27, 1991  12:52 PM

```
                HiRange = pos;
            } else {
                r.right = pos;
                LoRange = pos;
            }

RGBForeColor (ltColor);
            PaintRect (&r);

if (pos == CurrPos)
                CopyTime (ExactTime, limTime);
        }
    }
}

/* ShowNormal resets the "show" implicit parameters to DrawWindow to their normal, */
/* un-highlighted state. */
void ShowNormal ()
{
    ShowScrollButtons = SHOW_EMPTY;
    ShowElevButtons   = SHOW_NONE;
    ShowValButtons    = SHOW_NONE;
    ShowIndicHilite   = 0;
    ShowElevHilite    = 0;
}

/* DrawWindow draws the window to an off-screen pix-map, and copies it to wind.  doIt
/* should be false if this is an interim frame (the video window may or may not be */
/* filled in), and true for the final frame (video window will be updated). */
void DrawWindow (WindowPtr wind, int doIt)
{
    Rect       r;
    int        inc;
    int        dec;
    int        btn;
    TValue     *val;
    TSpan      ctxtSpan;

/* Erase with the blank window */
    SetPort (&BackPort);

RGBBackColor (&RGBWhite);
    RGBForeColor (&RGBBlack);

EraseRect (&CopyBox);

/* Choose the label, tick and context frequencies */
    ChooseIncr (TicIncr, TIC_WIDTH, &TicIdx, &TicCnt, IDX_HLIM, 1       );
    ChooseIncr (LblIncr, LBL_WIDTH, &LblIdx, &LblCnt, TicIdx  , TicCnt);
```

History.c                                                                    Page 26
Wednesday, February 27, 1991  12:52 PM

```
    SetUpCtxt (&ctxtSpan);

/* Fill in the smaller tic marks */
    r = FieldBox;
    r.top = r.bottom + UnitHeight[TicIdx+1];

RGBForeColor (&RGBGray);
    PaintRect (&r);

/* Draw the field display */
    LoRange = FIELD_L;
    HiRange = FIELD_R;

FillItIn = 0;
    NrContext = 0;

ClipRect (&ClipBox);

DrawField (FieldL, -1, &r, &ctxtSpan);
    DrawField (FieldR,  1, &r, &ctxtSpan);

ClipRect (&CopyBox);

if (LoRange < FIELD_L) LoRange = FIELD_L;
    if (HiRange > FIELD_R) HiRange = FIELD_R;

/* Frame the field */
    r = FieldBox;
    InsetRect (&r, -1, -1);

RGBForeColor (&RGBBlack);
    FrameRect (&r);

/* Update the status display */
    DrawValues ();

/* Draw the center mark */
    RGBForeColor (HiliteFore[ShowIndicHilite]);
    RGBBackColor (HiliteBack[ShowIndicHilite]);

MoveTo (CurrPos, FIELD_T);
    LineTo (CurrPos, FIELD_B-1);

DrawCursor (Indicator[TicIdx], CurrPos, FIELD_T, &IndicBox);

/* Draw the zoom elevator */
    r = ElevBox;

if (ShowElevButtons != SHOW_NONE && ShowValButtons != SHOW_NONE) {
        /* Show only the active part */
        RGBForeColor (&RGBLtBlue);
        PaintRect (&ElevBox);
```

History.c                                                                  Page 27
Wednesday, February 27, 1991 12:52 PM

```
        ElevRange (LblIdx, &inc, &dec);

r.top    = inc - ELEV_EXTRA;
        r.bottom = dec + ELEV_EXTRA + 1;
    }

RGBForeColor (&RGBMdBlue);
    PaintRect (&r);

RGBForeColor (HiliteFore[ShowElevHilite]);
    RGBBackColor (HiliteBack[ShowElevHilite]);

DrawCursor (ElevKnob, ELEV_H, SpanToElev (&CurrSpan), &KnobBox);

/* Draw the scroll buttons */
    DrawButton (BUTTON_MSE + BUTTON_LG + BUTTON_RT, ShowScrollButtons + COLOR_BLK + IS
    DrawButton (BUTTON_MSE + BUTTON_LG + BUTTON_LT, ShowScrollButtons + COLOR_BLK + IS /* Draw the elevator buttons */
    if (ShowElevButtons != SHOW_NONE) {
        if (ShowValButtons != SHOW_NONE) {
            inc -= ELEV_BUTTON;
            dec += ELEV_BUTTON;

} else {
            inc = ElevTop - ELEV_BUTTON;
            dec = ElevBot + ELEV_BUTTON;
        } if (WheelZoom)
            btn = BUTTON_WHL;
        else
            btn = BUTTON_MSE;

DrawButton (btn + BUTTON_SM + BUTTON_UP, ShowElevButtons + COLOR_RED + IS_INC,
        DrawButton (btn + BUTTON_SM + BUTTON_DN, ShowElevButtons + COLOR_RED + IS_DEC,
    }

/* Draw the value buttons */
    if (ShowValButtons != SHOW_NONE) {
        val = &Value[LblIdx];
        DrawButton (BUTTON_MSE + BUTTON_SM + BUTTON_RT, ShowValButtons + COLOR_RED + I
        DrawButton (BUTTON_MSE + BUTTON_SM + BUTTON_LT, ShowValButtons + COLOR_RED + I
    }

/* Debugging for enabled range */
    if (0) {
        DrawButton (BUTTON_MSE + BUTTON_SM + BUTTON_UP, SHOW_EMPTY + COLOR_BLK, LoRang
        DrawButton (BUTTON_MSE + BUTTON_SM + BUTTON_UP, SHOW_EMPTY + COLOR_BLK, HiRang
    }

/* Blast it to the screen */
    SetPort (wind);
```

```
History.c                                                               Page 28
Wednesday, February 27, 1991 12:52 PM CopyBits (
        &((GrafPtr) &BackPort)->portBits, &wind->portBits,
        &CopyBox, &CopyBox,
        srcCopy, nil);

UpdateVideo (doIt);
    ShowNormal ();
}

/* =============================== */
/* ===== CONTROLLER SETTINGS ===== */
/* =============================== */

/* ScrollField scrolls the field by delta pixels without moving the mark.  Lim is set
/* to indicate whether limit marks should be drawn for the scroll buttons. */
void ScrollField (int delta, int *lim)
{
    TSpan       span;

while (delta < 0) {
        TimeMinusSpan (CurrTime, &CurrSpan);
        delta++;
    } while (delta > 0) {
        TimePlusSpan (CurrTime, &CurrSpan);
        delta--;
    }

*lim = LIM_NONE;

if (CmpTime (CurrTime, LoTime) < 0) {
        CopyTime (CurrTime, LoTime);
        *lim = LIM_DEC;
    } if (CmpTime (CurrTime, HiTime) > 0) {
        CopyTime (CurrTime, HiTime);
        *lim = LIM_INC;
    }
}

/* ZoomField changes the present zoom in response to a vertical move of delta.  If idx
/* is -1 then the zoom is limited to the overall limits; otherwise it is limited to */
/* given units.  Lim is a state variable that keeps track of highlighting the axis */
/* limits; it should be initialized to LIM_NONE. */
void ZoomField (int dV, int idx, int *lim)
{
    TSpan       lo;
    TSpan       hi;
```

History.c                                                                Page 29
Wednesday, February 27, 1991  12:52 PM

```
    ShowElevButtons = SHOW_EMPTY;
    ShowElevHilite = 1;

if (dV != 0) {
        /* Find the limits */
        if (idx == -1) {
            lo = MinSpan;
            hi = MaxSpan;
        } else
            GetUnitSpan (idx, &lo, &hi);

if (dV < 0) {
            /* Mouse moved up ... Zoom out */
            ShowElevButtons = SHOW_INC;
            *lim = LIM_NONE;

do {
                MulSpan (&CurrSpan, ZoomOut);
            } while (++dV < 0);

if (CmpSpan (&CurrSpan, &hi) > 0) {
                CurrSpan = hi;
                *lim = LIM_INC;
            }

} else {
            /* Mouse moved down ... Zoom in */
            ShowElevButtons = SHOW_DEC;
            *lim = LIM_NONE;

do {
                MulSpan (&CurrSpan, ZoomIn);
            } while (--dV > 0);

if (CmpSpan (&CurrSpan, &lo) < 0) {
                CurrSpan = lo;
                *lim = LIM_DEC;
            }
        }
    }
}

/* ============================== */
/* ===== CONTROLLER EVENTS ===== */
/* ============================== */

/* SetScrollCursor maps speed from -16 .. +16 to one of the ten arrow cursors */
void SetScrollCursor (int speed)
{
    CursHandle  *crsr;
```

```
History.c                                                                Page 30
Wednesday, February 27, 1991  12:52 PM static int speedMap[17] = {
        0,  0,  1,  1,  2,  2,  3,  3,  4,  5,  6,  6,  7,  7,  8,  8,  9
    };

crsr = RScrollCrsr;

if (speed < 0) {
        speed = -speed;
        crsr = LScrollCrsr;
    }

SetCursor (*crsr[speedMap[speed]]);
}

/* ClickField tracks a click in the timeline.  Horizontal movement moves the indicator
/* and autoscrolls at the edges.  Vertical movement is remapped to zoom. */
void ClickField (WindowPtr wind, Point localPt)
{
    int       limScroll;
    int       limElev;
    int       done;
    int       dV;
    int       dH;
    int       prevH;
    Point     pt;
    int       temp;

static autoScroll[33] = {
        1,  1,  1,  1,  1,  2,  2,  2,
        2,  3,  3,  3,  3,  4,  4,  4,
        5,  5,  5,  6,  6,  7,  7,  8,
        9, 10, 11, 12, 13, 14, 15, 16, 16
    };

prevH = localPt.h;
    if (LoRange <= prevH && prevH < HiRange) {
        limScroll = LIM_NONE;
        limElev = LIM_NONE;

SetPort (wind);
        SetAxisLock (VERT_AXIS, LOCK_AXIS, 0, 0);
        SetAxisLock (HORZ_AXIS, LIMIT_AXIS, FIELD_LLIM-32, FIELD_RLIM+32);

done = !StillDown ();
        while (!done) {
            /* Get the cursor movement */
            GetCrsrLock (&pt);
            dV = pt.v;
            dH = pt.h;

if (WheelZoom)
                dV = GetWheel (&Wheel);
```

History.c                                                                Page 31
Wednesday, February 27, 1991 12:52 PM

```
        else
            if (ABS (dH) >= ABS (dV))
                dV = 0;

SetPort (wind);
        GetMouse (&pt);

/* Change the center point with horizontal movement */
        if (pt.h < FIELD_LLIM) {
            /* Autoscroll off left side */
            temp = FIELD_LLIM-pt.h;
            if (temp > 32) temp = 32;
            temp = -autoScroll[temp];

ScrollField (temp+FIELD_LLIM-CurrPos, &limScroll);
            SetScrollCursor (temp);

CurrPos = FIELD_LLIM;
            ShowScrollButtons = SHOW_DEC;

} else if (pt.h > FIELD_RLIM) {
            /* Autoscroll off right side */
            temp = pt.h-FIELD_RLIM;
            if (temp > 32) temp = 32;
            temp = autoScroll[temp];

ScrollField (temp+FIELD_RLIM-CurrPos, &limScroll);
            SetScrollCursor (temp);

CurrPos = FIELD_RLIM;
            ShowScrollButtons = SHOW_INC;

} else {
            /* Move the selected spot */
            ScrollField (pt.h-CurrPos, &limScroll);
            CurrPos = pt.h;

SetCursor (*EmptyCrsr);
            limScroll = LIM_NONE;
        }

/* Change the scale with vertical movement */
        if (WheelZoom || ScrollZoom || ShowScrollButtons == SHOW_EMPTY)
            ZoomField (dV, -1, &limElev);

/* Show the change */
        ShowScrollButtons += limScroll;
        ShowElevButtons   += limElev;
        ShowIndicHilite = 1;

if (!StillDown ()) {
            ShowNormal ();
            done = true;
```

```
History.c                                                                Page 32
Wednesday, February 27, 1991  12:52 PM

}

DrawWindow (wind, done);
            }

SetAxisLock (VERT_AXIS, UNLOCK_AXIS, 0, 0);
            SetAxisLock (HORZ_AXIS, UNLOCK_AXIS, 0, 0);

} else {
            /* Clicked on gray timeline */
            SysBeep (10);
        }
}

/* ClickElev tracks a click on the elevator (jump is true) or the elevator knob */
/* (jump is false).  The knob follows the vertical position.  Horizontal position */
/* will "undo" the drag if it is too far, à la Mac scrollbars.  This is the only */
/* undo-able control, perhaps it should not behave this way. */
void ClickElev (WindowPtr wind, Point home, int jump)
{
    int         done;
    TSpan       orig;
    int         offset;
    Point       pt;
    int         pos;

orig = CurrSpan;

if (jump)
        offset = 0;
    else
        offset = SpanToElev (&CurrSpan) - home.v;

done = !StillDown ();
    while (!done) {
        SetPort (wind);
        GetMouse (&pt);

pos = pt.h - ELEV_H;
        if (pos < 0) pos = -pos;
        if (pos < UNDO_ELEV) {
            /* Find where the elevator should be */
            pos = pt.v + offset;

if (pos < ElevTop) pos = ElevTop;
            if (pos > ElevBot) pos = ElevBot;

/* Nudge the elevator */
            while (SpanToElev (&CurrSpan) < pos)
                MulSpan (&CurrSpan, ZoomIn);

while (SpanToElev (&CurrSpan) > pos)
```

History.c
Wednesday, February 27, 1991 12:52 PM

```
            MulSpan (&CurrSpan, ZoomOut);

ShowElevHilite = 1;

} else {
            /* Undo the change */
            CurrSpan = orig;
        }

/* Show the change */
        if (!StillDown ()) {
            ShowNormal ();
            done = true;
        }

DrawWindow (wind, done);
    }
}

/* ClickScroll tracks a click on the scroll arrows.  Horizontal position controls */
/* scroll speed.  Vertical movement alters zoom. */

/* NOTE: There is no compensation for varying machine speed here or in the ClickField */
/*       autoscroll code.  Both should scroll at some spans-per-tick, rather than */
/*       spans-per-cycle, as is done here. */
void ClickScroll (WindowPtr wind, Point home, int right)
{
    int        limScroll;
    int        limElev;
    int        done;
    Point      pt;
    int        prevH;
    int        dV;
    int        dH;
    int        temp;

static scrollSpeed[33] = {
        1,  2,  2,  3,  3,  4,  4,  5,
        5,  6,  6,  7,  7,  7,  8,  8,
        8,
        8,  8,  9,  9,  9, 10, 10, 11,
       11, 12, 12, 13, 13, 14, 15, 16
    };

limScroll = LIM_NONE;
    limElev = LIM_NONE;

SetPort (wind);
    SetAxisLock (VERT_AXIS, LOCK_AXIS, 0, 0);
    SetAxisLock (HORZ_AXIS, LIMIT_AXIS, home.h-16, home.h+16);

done = !StillDown ();
```

```
History.c                                                      Page 34
Wednesday, February 27, 1991  12:52 PM while (!done) {
        /* Get the cursor movement */
        GetCrsrLock (&pt);
        dV = pt.v;
        dH = pt.h;

if (WheelZoom)
            dV = GetWheel (&Wheel);
        else
            if (ABS (dH) >= ABS (dV))
                dV = 0;

SetPort (wind);
        GetMouse (&pt);

/* Scroll based on the horizontal position */
        temp = pt.h - home.h;
        if (!right) temp = -temp;

temp += 16;
        if (temp < 0 ) temp = 0;
        if (temp > 32) temp = 32;

temp = scrollSpeed[temp];
        if (!right) temp = -temp;

ScrollField (temp, &limScroll);
        SetScrollCursor (temp);

/* Change the scale with vertical movement */
        if (WheelZoom || ScrollZoom)
            ZoomField (dV, -1, &limElev);

/* Show the change */
        if (right)
            ShowScrollButtons = SHOW_INC;
        else
            ShowScrollButtons = SHOW_DEC;

/* Show the changes */
        ShowScrollButtons += limScroll;
        ShowElevButtons   += limElev;

if (!StillDown ()) {
            ShowNormal ();
            done = true;
        }

DrawWindow (wind, done);
    }

SetAxisLock (VERT_AXIS, UNLOCK_AXIS, 0, 0);
    SetAxisLock (HORZ_AXIS, UNLOCK_AXIS, 0, 0);
```

History.c
Wednesday, February 27, 1991 12:52 PM

```c
}

/* ClickValue tracks a click on a value field.  Horizontal movement is mapped to */
/* incrementing/decrementing the value field.  Vertical movement is mapped to zoom. */
void ClickValue (WindowPtr wind, Point home, int idx)
{
    int         limElev;
    int         limVal;
    int         done;
    int         loc;
    Point       pt;
    TSpan       span;
    TTime       lo;
    TTime       hi;

limElev = LIM_NONE;
    limVal  = LIM_NONE;

/* Jump to the selected units */
    if (LblIdx != idx)
        GetUnitMid (idx, &CurrSpan);

/* Set up */
    loc = INCR_COUNT >> 1;

if (idx != IDX_MSEC)
        SetSpan (&span, 0x00010000, idx);
    else
        SetSpan (&span, FixDiv (1, FRAMES_SEC), IDX_SEC);

CopyTime (lo, LoTime);
    CopyTime (hi, HiTime);

TimePlusSpan  (lo, &span);
    TimeMinusSpan (hi, &span);

HideCursor ();

SetPort (wind);
    SetAxisLock (VERT_AXIS, LOCK_AXIS, 0, 0);
    SetAxisLock (HORZ_AXIS, LOCK_AXIS, 0, 0);

done = !StillDown ();
    while (!done) {
        ShowElevButtons = SHOW_EMPTY;
        ShowValButtons  = SHOW_EMPTY;

GetCrsrLock (&pt);

if (WheelZoom)
            pt.v = GetWheel (&Wheel);
        else
```

```
History.c                                                           Page 36
Wednesday, February 27, 1991 12:52 PM if (ABS (pt.h) >= ABS (pt.v))
                pt.v = 0;
            else
                pt.h = 0;

/* Bump by the horizontal movement */
        loc += pt.h;

while (loc >= INCR_COUNT) {
            loc -= INCR_COUNT;

if (CmpTime (CurrTime, hi) <= 0) {
                TimePlusSpan (CurrTime, &span);
                limVal = LIM_NONE;
            } else
                limVal = LIM_INC;

ShowValButtons = SHOW_INC;
        } while (loc < 0) {
            loc += INCR_COUNT;

if (CmpTime (CurrTime, lo) >= 0) {
                TimeMinusSpan (CurrTime, &span);
                limVal = LIM_NONE;
            } else
                limVal = LIM_DEC;

ShowValButtons = SHOW_DEC;
        }

/* Zoom by the vertical movement */
        ZoomField (pt.v, idx, &limElev);

if (pt.v) loc = INCR_COUNT >> 1;

/* Show the changes */
        ShowElevButtons += limElev;
        ShowValButtons  += limVal;

if (!StillDown ()) {
            ShowNormal ();
            done = true;
        }

DrawWindow (wind, done);
    }

SetAxisLock (VERT_AXIS, UNLOCK_AXIS, 0, 0);
    SetAxisLock (HORZ_AXIS, UNLOCK_AXIS, 0, 0);

ShowCursor ();
```

History.c                                                                                    Page 37
Wednesday, February 27, 1991 12:52 PM

```c
}

/* ClickContext tracks a click on a context frame.  Horizontal position is mapped */
/* to indicator position.  Vertical movement controls zoom. */
void ClickContext (WindowPtr wind, Point home, TContext *ctxt)
{
    int         limElev;
    int         done;
    TTime       time;
    int         offset;
    Point       pt;
    int         dV;
    int         dH;

limElev = LIM_NONE;

HideCursor ();

CopyTime (time, ctxt->time);

CurrPos = ctxt->box.left + ctxt->box.right >> 1;
    offset = CurrPos - home.h;

SetPort (wind);
    SetAxisLock (VERT_AXIS, LOCK_AXIS, 0, 0);
    SetAxisLock (HORZ_AXIS, LIMIT_AXIS, FIELD_LLIM-offset, FIELD_RLIM-offset);

done = !StillDown ();
    while (!done) {
        /* Get the cursor movement */
        GetCrsrLock (&pt);
        dV = pt.v;
        dH = pt.h;

if (WheelZoom)
            dV = GetWheel (&Wheel);
        else
            if (ABS (dH) >= ABS (dV))
                dV = 0;

SetPort (wind);
        GetMouse (&pt);

/* Move horizontally */
        CurrPos = pt.h+offset;

/* Change the scale with vertical movement */
        ZoomField (dV, -1, &limElev);

/* Show the change */
        CopyTime (CurrTime, time);
        CopyTime (CurrCtxt, time);
```

```
History.c                                                              Page 38
Wednesday, February 27, 1991 12:52 PM ShowElevButtons += limElev;
        ShowIndicHilite = 1;

if (!StillDown ()) {
            ShowNormal ();
            done = true;
        }

DrawWindow (wind, done);
    }

SetAxisLock (VERT_AXIS, UNLOCK_AXIS, 0, 0);
    SetAxisLock (HORZ_AXIS, UNLOCK_AXIS, 0, 0);

ShowCursor ();
}

/* PtInXRect returns true if pt lies inside r or within margin pixels of r */
int PtInXRect (Point pt, Rect *r, int margin)
{
    Rect        t;

t = *r;
    InsetRect (&t, -margin, -margin);

return (PtInRect (pt, &t));
}

/* TrackClick calls the appropriate tracking routine when the mouse is clicked */
void TrackClick (WindowPtr wind, Point origPt)
{
    Point       localPt;
    int         looking;
    TContext    *ctxt;
    int         idx;

SetPort (wind);
    localPt = origPt;
    GlobalToLocal (&localPt);

if      (PtInRect  (localPt, &FieldBox   )) ClickField  (wind, localPt);
    else if (PtInRect  (localPt, &IndicBox   )) ClickField  (wind, localPt);
    else if (PtInRect  (localPt, &KnobBox    )) ClickElev   (wind, localPt, 0);
    else if (PtInXRect (localPt, &ElevBox, 3 )) ClickElev   (wind, localPt, 1);
    else if (PtInRect  (localPt, &LScrollBox )) ClickScroll (wind, localPt, 0);
    else if (PtInRect  (localPt, &RScrollBox )) ClickScroll (wind, localPt, 1);
    else {
        looking = 1;

/* Search the values */
```

```c
        idx = LoUnit;
        while (idx <= HiUnit && looking)
            if (PtInXRect (localPt, &Value[idx].box, 1)) {
                ClickValue (wind, localPt, idx);
                looking = 0;
            } else
                idx++;

/* Search the context frames */
        if (PtInXRect (localPt, &CtxtBox, 2)) {
            ctxt = Context;
            idx = 0;
            while (idx < NrContext && looking)
                if (PtInRect (localPt, &ctxt->box)) {
                    ClickContext (wind, localPt, ctxt);
                    looking = 0;
                } else {
                    ctxt++;
                    idx++;
                }
        }
    }
}

/* =========================== */
/* ===== EVENT HANDLING ===== */
/* =========================== */

/* DrawUpdate draws the entire contents of the window -- the background, the window */
/* frame and the window contents. */
void DrawUpdate (WindowPtr wind)
{
    Rect    r;
    int     high;
    int     wide;

SetPort (wind);

if (wind == MyWindow) {
        ClipRect (&wind->portRect);

/* Draw the background */
        r = (**BackPic).picFrame;

high = r.bottom - r.top;
        wide = r.right - r.left;

r.top   = wind->portRect.top;
        r.left  = wind->portRect.left;

r.bottom = r.top  + high;
        r.right  = r.left + wide;
```

```
History.c                                                                Page 40
Wednesday, February 27, 1991  12:52 PM DrawPicture (BackPic, &r);

OffsetRect (&r, wide, 0);
        DrawPicture (BackPic, &r);

OffsetRect (&r, 0, high);
        DrawPicture (BackPic, &r);

OffsetRect (&r, -wide, 0);
        DrawPicture (BackPic, &r);

/* Draw the window picture */
        DrawPicture (WindPic, &TotalBox);

/* Draw the window contents */
        DrawWindow (wind, true);
    }
}

/* UpdateMenus makes the menus reflect the current settings */
void UpdateMenus ()
{
    CheckItem (MenuOptions, optOKZoom,  ScrollZoom != 0);
    CheckItem (MenuOptions, optNoZoom,  ScrollZoom == 0);

CheckItem (MenuOptions, optHistory, IsHistory != 0);
    CheckItem (MenuOptions, optVideo,   IsHistory == 0);

CheckItem (MenuOptions, optGryDbl,  GrayDisable != 0);
    CheckItem (MenuOptions, optWhtDbl,  GrayDisable == 0);

CheckItem (MenuOptions, optWhlZoom, WheelZoom != 0);
    CheckItem (MenuOptions, optWhlScrl, WheelScroll != 0);
} void DoMenuCommand (long itemVal)
{
    WindowPtr   wind;
    int         item;
    Str255      s;
    int         player;

wind = FrontWindow ();
    item = LoWord (itemVal);

switch (HiWord (itemVal)) {
        case mApple:
            switch (item) {
                case appleAbout:
                    Alert (128, nil);
```

History.c
Wednesday, February 27, 1991 12:52 PM

```
                break;

default:
                GetItem (MenuApple, item, s);
                OpenDeskAcc (s);
                break;
        }
        break;

case mFile:
        switch (item) {
            case fileQuit:
                Running = false;
                break;
        }
        break;

case mOptions:
        switch (item) {
            case optOKZoom:     ScrollZoom = 1;             break;
            case optNoZoom:     ScrollZoom = 0;             break;
            case optHistory:    SetUnits (1);               break;
            case optVideo:      SetUnits (0);               break;
            case optGryDbl:     GrayDisable = 1;            break;
            case optWhtDbl:     GrayDisable = 0;            break;
            case optWhlZoom:    WheelZoom = !WheelZoom;     break;
            case optWhlScrl:    WheelScroll = !WheelScroll; break;
        }

GetWheel (&Wheel);
        DrawWindow (MyWindow, true);
        UpdateMenus ();
        break;

case mPlayer:
        switch (item) {
            case playNone:
            case playAnim:
            case play4200:
                CheckItem (MenuPlayer, playNone, false);
                CheckItem (MenuPlayer, playAnim, false);
                CheckItem (MenuPlayer, play4200, false);

CheckItem (MenuPlayer, item, true);

switch (item) {
                    case playNone:  player = NO_PLAYER;     break;
                    case playAnim:  player = ANIMATION;     break;
                    case play4200:  player = PIONEER4200;   break;
                }

InvalCache ();
                DrawUpdate (MyWindow);
```

```
History.c                                                                    Page 42
Wednesday, February 27, 1991 12:52 PM SetPlayer (player);
                    SetUnits (IsHistory);
                    break;

case playDig:
                    DigitizeDisk ();
            }
            break;
    }

HiliteMenu (0);
}

/* TrackMouse is a aid to finding the coordinates of things in the window frame pictur
void TrackMouse (Point pt)
{
    char    s[32];

SetCursor (*GetCursor (crossCursor));

sprintf (s, "x(%i,%i)       ", pt.h, pt.v);
    s[0] = strlen (s) - 1;

TextMode (srcCopy);
    MoveTo (0, -50);
    DrawString (s);
} void Loop ()
{
    Point       pt;
    EventRecord ev;
    WindowPtr   wind;
    char        ch;
    int         val;
    int         temp;
    TTime       time;

do {
        wind = FrontWindow ();
        if (wind == MyWindow) {
            SetPort (wind);
            GetMouse (&pt);

if (1)
                SetCursor (&arrow);
            else
                TrackMouse (pt);
        }
```

```
History.c                                                                    Page 43
Wednesday, February 27, 1991  12:52 PM if (GetNextEvent (everyEvent, &ev)) {
                switch (ev.what) {
                    case mouseDown:
                        switch (FindWindow (ev.where, &wind)) {
                            case inMenuBar:
                                DoMenuCommand (MenuSelect (ev.where));
                                break;

case inSysWindow:
                                SystemClick (&ev, wind);
                                break;

case inContent:
                                if (wind != FrontWindow ())
                                    SelectWindow (wind);
                                else
                                    TrackClick (wind, ev.where);
                                break;

case inDrag:
                                DragWindow (wind, ev.where, &screenBits.bounds);
                                break;

case inGoAway:
                                if (TrackGoAway (wind, ev.where))
                                    Running = 0;
                        }
                        break;

case keyDown:
                        ch = ev.message & charCodeMask;
                        if (ev.modifiers & cmdKey)
                            DoMenuCommand (MenuKey (ch));
                        break;

case activateEvt:
                        /* Do nothing */
                        break;

case updateEvt:
                        wind = (WindowPtr) ev.message;

BeginUpdate (wind);
                        DrawUpdate  (wind);
                        EndUpdate   (wind);
                        break;
                }

} else if (WheelScroll && (val = GetWheel (&Wheel))) {
                /* Scroll the field by the thumbwheel */
                ScrollField (val, &temp);
                DrawWindow (MyWindow, false);
```

```
History.c                                                                Page 44
Wednesday, February 27, 1991 12:52 PM /* NOTE: This should do some kind of highlighting */

} else if (!IsHistory && PollPlayer (time)) {
            /* Player has played on ... move the timeline accordingly */
            CopyTime (CurrTime, time);
            DrawWindow (MyWindow, false);

/* NOTE: This should not happen since we don't let the videodisk "play" */

} else if (FillItIn) {
            /* Some context frames are not filled in ... try again */
            DrawWindow (MyWindow, false);

} else {
            SystemTask ();
        }
    } while (Running);
}

/* ========================================= */
/* ===== INITIALIZE AND TERMINATE ===== */
/* ========================================= */ void Init ()
{
    EventRecord     ev;
    int             i;
    int             v;
    int             h;

/* Initialize the toolbox */
    MaxApplZone ();
    MoreMasters ();

InitGraf    (&thePort);
    InitFonts   ();
    InitWindows ();
    InitMenus   ();
    TEInit      ();
    InitDialogs (nil);
    InitCursor  ();

GetNextEvent (everyEvent, &ev);
    GetNextEvent (everyEvent, &ev);
    GetNextEvent (everyEvent, &ev);

/* Initialize my own tools */
    InitCrsrLock ();
    InitTimeMath ();
    InitPlayer ();
    InitCache (CTXT_WIDE, CTXT_HIGH);
    InitWheel (&Wheel);
```

```
History.c                                                          Page 45
Wednesday, February 27, 1991  12:52 PM /* Form the menubar */
    MenuApple   = GetMenu (mApple);
    MenuFile    = GetMenu (mFile);
    MenuOptions = GetMenu (mOptions);
    MenuPlayer  = GetMenu (mPlayer);

AddResMenu (MenuApple, 'DRVR');

InsertMenu (MenuApple  , 0);
    InsertMenu (MenuFile   , 0);
    InsertMenu (MenuOptions, 0);
    InsertMenu (MenuPlayer , 0);

DrawMenuBar ();

UpdateMenus ();

/* Connect to the default player */
    SetPlayer (NO_PLAYER);
    CheckItem (MenuPlayer, playNone, true);

/* Put up the window */
    MyWindow = GetNewCWindow (128, nil, (WindowPtr) -1);

SetPort (MyWindow);
    TextFont (geneva);
    TextSize (9);
    TextFace (bold);

/* Grab the background picture */
    BackPic = GetPicture (128);

/* Grab the window picture */
    WindPic = GetPicture (129);
    TotalBox = (**WindPic).picFrame;

/* Grab the patterns */
    Stripes = GetPattern (128);

/* Center the window */
    SetPort (MyWindow);

h = MyWindow->portRect.right - MyWindow->portRect.left;
    h -= TotalBox.right - TotalBox.left;
    h >>= 1;

v = MyWindow->portRect.bottom;
    v -= TotalBox.bottom - TotalBox.top;
    v -= 30;

SetOrigin (-h, -v);
    ClipRect (&MyWindow->portRect);
```

```
History.c                                                          Page 46
Wednesday, February 27, 1991  12:52 PM TotalBox.bottom -= TotalBox.top;
    TotalBox.right  -= TotalBox.left;

TotalBox.top  = 0;
    TotalBox.left = 0;

/* Set up the off-screen bitmap for drawing the window contents */
    MakeOffscreen (&BackPort, &CopyBox);

TextFont (geneva);
    TextSize (9);

/* Grab the cursors */
    EmptyCrsr = GetCursor (128);
    ElevKnob  = GetCursor (129);

for (i = 0; i < 10; i++) {
        LScrollCrsr[i] = GetCursor (2000+i);
        RScrollCrsr[i] = GetCursor (3000+i);
    }

Indicator[IDX_USEC] =
    Indicator[IDX_MSEC] = GetCursor (1000);
    Indicator[IDX_SEC ] = GetCursor (1001);
    Indicator[IDX_MIN ] =
    Indicator[IDX_HOUR] = GetCursor (1002);
    Indicator[IDX_DAY ] =
    Indicator[IDX_MNTH] = GetCursor (1003);
    Indicator[IDX_YEAR] = GetCursor (1004);

for (i = 0; i < NR_BUTTON; i++)
        ButtonCrsr[i] = GetCursor (BUTTON_BASE+i);

/* Set up globals */
    SetUnits (IsHistory);

ZoomOut = FixDiv (ZOOM_NUM, ZOOM_DNM);
    ZoomIn  = FixDiv (ZOOM_DNM, ZOOM_NUM);

ShowNormal ();

/* Go... */
    Running = 1;

#if PROFILE
    *stdout = *fopen ("Profile", "w");
    InitProfile (200, 200);
#endif
} void Term ()
```

```
History.c                                                              Page 47
Wednesday, February 27, 1991  12:52 PM {
    TermCache ();
    TermPlayer ();
    TermTimeMath ();
    TermCrsrLock ();
} void main ()
{
    Init ();
    Loop ();
    Term ();
}
```

What is claimed is:

1. In a computer system, a method for accessing a data field comprising the steps of;

positioning a moveable cursor to locations on a display screen in response to movement of a cursor positioning device;

remapping control of said cursor positioning device from controlling a position of said moveable cursor to controlling both a scale and a segment of said data field for display on said display screen, wherein said cursor positioning device performs a dual function of controlling movement of said cursor and controlling said scale and said segment, depending on a signal indicated by a switch;

when control of said cursor positioning device is remapped:

increasing said scale at which the data field is displayed according to movement of said cursor positioning device in a first direction of a first axis, wherein sustained movement of said cursor positioning device in said first direction of said first axis continuously increases said scale at which said segment of said data field is displayed;

decreasing the scale at which said data field is displayed according to movement of said cursor positioning device in a second direction in the first axis, wherein continuous movement of said cursor positioning device in said second direction of said first axis continuously decreases said scale at which said segment of said data field is displayed;

controlling which segment of the data field is displayed according to movement of said cursor positioning device in a second axis, wherein continued movement of said cursor positioning device relative to said second axis causes successive segments of said data field to be displayed at the scale which is selected by movement of said cursor positioning device in said first axis.

2. The method as defined by claim 1 wherein moving the cursor positioning device in an upward motion increases the scale and moving the cursor positioning device in a downward motion decreases the scale.

3. The method as defined by claim 2 wherein moving the cursor positioning device to the right causes a later segment of the data field to be displayed and moving the mouse to the left causes an earlier segment of the data field to be displayed.

4. The method as defined by claim 3 wherein a particular piece of data can be accessed within the data field having six orders of magnitude.

5. The method as defined by claim 4 wherein the segment is represented by a timeline.

6. The method as defined by claim 5 wherein the scale and the segment are controlled by positioning the cursor over an icon and activating a switch.

7. The method as defined by claim 6 wherein the cursor positioning device includes one of a mouse, a track ball, a touch tablet, a joystick.

8. A method of implementing a single input device for controlling movement of a cursor displayed on a computer and for controlling access of a particular piece of data within a data field displayed by a computer system, said method comprising the steps of:

positioning a moveable cursor to a location on a display screen in response to movement of said input device when a signal supplied by said input device is in a first state;

when said signal is in a second state:

remapping control of said input device, wherein movement of said input device controls both a resolution and a range of said data field for display on said display screen rather than positioning said moveable cursor;

selectively varying said resolution at which said data field is displayed responsive to movement of said input device in a first axis, wherein continuous movement of said input device in said first axis continuously changes said resolution;

controlling said range of the data field for display in response to movement of said cursor positioning device in a second axis, wherein continuous movement in the second axis continually causes different ranges of the data field to be displayed;

moving said cursor positioning device in the first and second axes to simultaneously vary said resolution and said range of display, until the particular piece of data is accessed.

9. The method as defined by claim 8 wherein said input device is comprised of a mouse and the resolution is controlled by moving said mouse in the first axis and the range is controlled by moving the mouse in the second axis.

10. The method as defined by claim 8 wherein said input device is comprised of a trackball and the resolution is controlled by moving said trackball in the first axis and the range is controlled by moving the trackball in the second axis.

* * * * *